April 30, 1963 G. M. RAULINS ETAL 3,087,547
WELL TOOLS FOR SECURING FLOW CONDUCTORS IN A TUBULAR MEMBER
Filed Oct. 29, 1958 9 Sheets-Sheet 1

INVENTORS
George M. Raulins
Dick M. Koons

BY *Hastings Ashley*

ATTORNEY

April 30, 1963

G. M. RAULINS ETAL 3,087,547

WELL TOOLS FOR SECURING FLOW CONDUCTORS IN A TUBULAR MEMBER

Filed Oct. 29, 1958

INVENTORS
George M. Raulins
Dick M. Koons

BY *Hastings Ackley*

ATTORNEY

April 30, 1963 G. M. RAULINS ETAL 3,087,547
WELL TOOLS FOR SECURING FLOW CONDUCTORS IN A TUBULAR MEMBER
Filed Oct. 29, 1958 9 Sheets-Sheet 4

INVENTORS
George M. Raulins
Dick M. Koons

BY
ATTORNEY

INVENTORS
George M. Raulins
Dick M. Koons
ATTORNEY

INVENTORS
George M. Raulins
Dick M. Koons

April 30, 1963 G. M. RAULINS ETAL 3,087,547
WELL TOOLS FOR SECURING FLOW CONDUCTORS IN A TUBULAR MEMBER
Filed Oct. 29, 1958 9 Sheets-Sheet 7

INVENTORS
George M. Raulins
Dick M. Koons

BY
ATTORNEY

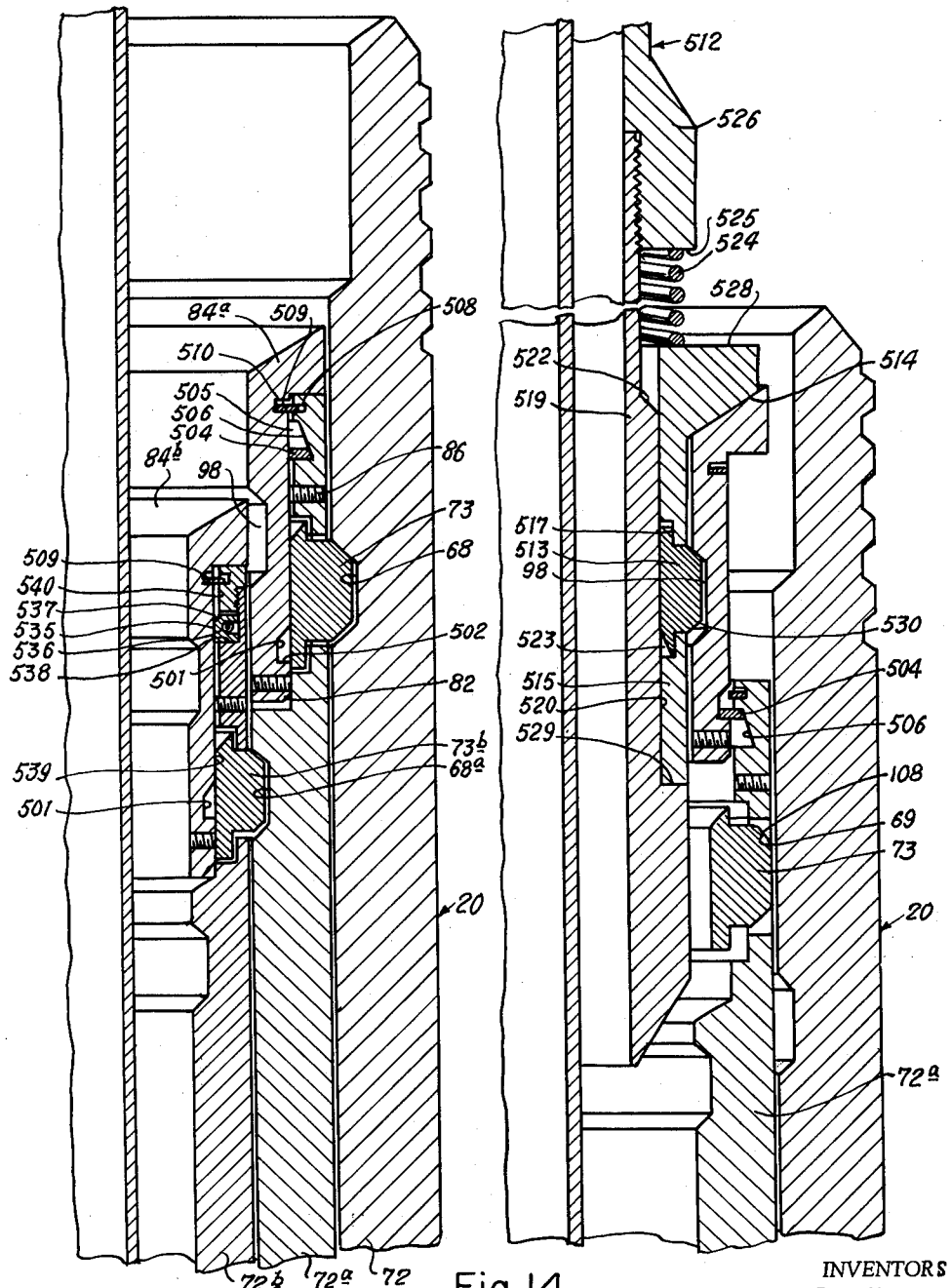

United States Patent Office 3,087,547
Patented Apr. 30, 1963

3,087,547
WELL TOOLS FOR SECURING FLOW CONDUCTORS IN A TUBULAR MEMBER
George M. Raulins and Dick M. Koons, Dallas, Tex., assignors, by mesne assignments, to Otis Engineering Corporation, Dallas County, Tex., a corporation of Delaware
Filed Oct. 29, 1958, Ser. No. 770,504
25 Claims. (Cl. 166—89)

This invention relates to well tools and more particularly to well tools for telescopically securing a plurality of well casings in a tubular member.

An object of this invention is to provide a new and improved well tool means for telescopically securing a plurality of well casings in spaced relation in a tubular member, such as a wellhead.

A further object of the invention is to provide new and improved well tools for releasably securing a plurality of casings in a tubular member, such as a wellhead, in spaced relation to one another and providing means affording communication between the annular flow passages between each pair of adjacent well casings and points remote from the tubular member.

A still further object of the invention is to provide a well tool for releasably securing a well casing in the wellhead which includes a mandrel having means for releasably locking the well tool in fixed position in the wellhead and having a port communicating with a lateral port of the wellhead which communicates with the interior of the well casing carried by the mandrel.

Another object of the invention is to provide a mandrel having means for releasably connecting the mandrel in a tubular member, such as a wellhead, which is provided with a lateral port communicating with the interior of the mandrel and a lateral port of the tubular member and with seal means for sealing between the mandrel and the tubular member above and below such ports.

Still another object of the invention is to provide a mandrel which is releasably connectable in a tubular member, such as a wellhead, and is provided with flow passages through which a sealing fluid may be transmitted to the seal means to effect a more fluid tight seal between the mandrel and the tubular member.

A further object of the invention is to provide a mandrel which is releasably connectable with a tubular member wherein the passage means for transmitting the sealing fluid to the seal means is provided with valve mean whereby the flow passage may be closed after it has been filled with the sealing fluid.

A still further object is to provide a mandrel which is releasably connectable in a wellhead wherein the valve means for the flow passage is biased to prevent flow of the sealing fluid from the flow passage while permitting such flow thereinto.

Another object of the invention is to provide a mandrel for connection in a tubular member wherein the valve for the flow passage is movable by a suitable running tool from a position wherein flow of fluid into the flow passage is permitted to a position wherein the flow passages are closed against flow of fluids therefrom.

Still another object of the invention is to provide a well tool having at least an annular external recess in which a seal means is disposed and having a flow passage means extending from the seal recess and opening interiorly of the well tool whereby a sealing fluid may be forced through the flow passage to the seal groove to force the seal into tighter engagement with any member in which the well tool may be disposed.

Still another object is to provide a well tool wherein the flow passage for the introduction of seal fluid to a seal disposed in an external recess of the well tool is provided internally with a suitable valve means through which sealing fluid may be introduced thereinto from the interior of the well tool.

A further object of the invention is to provide a well tool wherein the flow passage is provided with valve means which permits flow of fluid from the interior of the well tool and which prevents flow of such fluid to the interior of the well tool.

A still further object of the invention is to provide a well tool assembly having an external tubular member and a plurality of telescoped mandrels in said fixed tubular mandrel member, the mandrels and the tubular member having aligned lateral ports providing communication between the exterior of the tubular member and the cylindrical flow passages between the internal mandrels.

A still further object of the invention is to provide a well tool system wherein the mandrels are provided with annular grooves in which are received seal means for sealing above and below the lateral ports between each adjacent pair of the mandrels and between the outermost mandrel and the outer tubular member.

Another object of the invention is to provide a well tool system wherein the mandrels are provided with passage means through which a sealing fluid may be injected into the annular grooves to compress the seal means to effect a more perfect seal between adjacent mandrels.

Still another object of the invention is to provide a well tool system wherein the flow passages for the sealing fluid are provided with valve means for preventing flow of well fluids from the flow passages to the interiors of the mandrels.

A further object of the invention is to provide a well tool system having a plurality of telescoped tubular members wherein the internal walls of each of the tubular members slopes inwardly and downwardly whereby wedge lock members may be inserted thereinto between each tubular member and another tubular member telescoped therein to lock such internal tubular member against longitudinal movement.

A still further object is to provide a well tool system having a plurality of telescoped mandrels wherein at least one of the tubular members has an internal annular wall which slopes downwardly and inwardly and wherein the adjacent tubular member telescoped therein is provided with a plurality of seal means, each of the seal means projecting farther outwardly than the next lower seal means whereby each seal means effects a seal between the tubular members even though the walls of the external tubular members diverge upwardly.

Another object is to provide a well tool releasably securable in a wellhead which has a lock sleeve movable longitudinally relative to a mandrel to lock a locking means in expanded wellhead engaging position.

Still another object is to provide a running tool for engaging the lock sleeve to move it out of locking position prior to the exertion of an upward force on the mandrel whereby the locking means are freed for movement to retracted position.

Additional objects and advantages of the invention will be readily apparent from the reading of the following description of a device constructed in accordance with the invention, and reference to the accompanying drawings thereof, wherein:

FIGURE 13 is a vertical partly sectional view similar to FIGURE 1 showing two different forms of locking means for the mandrels;

FIGURE 14 is a view similar to FIGURE 13 showing a running tool removing one of the mandrels of FIGURE 13 from the wellhead; and, FIGURE 15 is a partly sectional view showing a modified form of the conduit connecting device illustrated in FIGURE 5.

Figure 1:
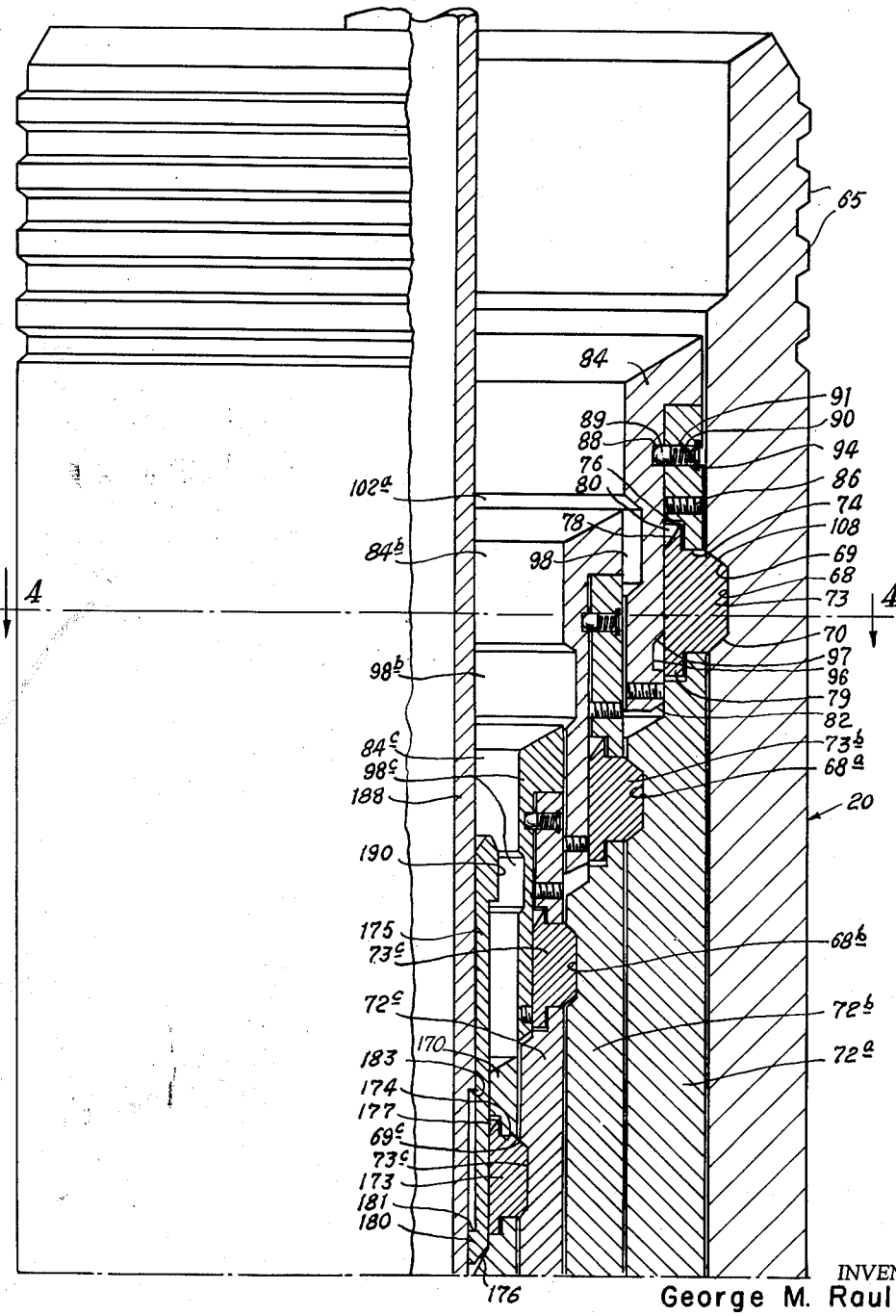
FIGURE 1 is a vertical, partly sectional view of the upper portion of a well tool assembly embodying the invention.

Referring now particularly to FIGURES 1 through 5 of the drawings, the well tool system there illustrated includes a wellhead 20 which is provided with a plurality of longitudinally spaced lateral ports 21, 22, 23 and 24. External conduits 26, 27, 28 and 29 are rigidly secured to the wellhead by any suitable means, such as welding, and provide communication between the ports 21, 22, 23 and 24, and the lateral ports 31, 32, 33 and 34, respectively, of a bowl 36. A mandrel 38 is removably positioned in the bowl by means of split ring 39 disposed in an external annular recess 40 of the mandrel which is receivable in an internal annular lock recess 41 of the bowl. The split ring is cammed inwardly upon contacting the upper cam shoulder 43 of the bowl and resiliently moves into the internal lock recess 41 when aligned therewith.

The mandrel is provided with flow passages 44, 45, 46 and 47 which communicate with the lateral ports 31, 32, 33 and 34, respectively, at their laterally opening ends and which communicate with the pipes 48, 49, 50 and 51, respectively, which extend from their upper ends to a remote position, such as the surface of a body of water in which the wellhead 20 is submerged. The pipes 48, 49, 50 and 51 may be rigidly secured to the mandrel 38 by any suitable means, such as welding. The mandrel is provided with a plurality of external annular recesses in which seal means 54 are disposed to effect a fluid tight seal between the bowl and the mandrel on opposite sides of each of the lateral ports 31, 32, 33 and 34. The bowl and the mandrel are also provided with aligned annular flow recesses 55 and 56, respectively, which communicate with the lateral ports 31, 32, 33, and 34 and the passages 44, 45, 46, and 47 in order to eliminate the necessity of orienting the mandrel in a specific manner in the bowl with respect to the lateral ports of the bowl. In this manner the flow of fluid may take place through the lateral ports 21, 22, 23 and 24 of the wellhead to or from a remote point by means of the pipes 48, 49, 50 and 51, the mandrel 38, the bowl 36 and the conduits 26, 27, 28 and 29.

The bowl is provided with an opening 58 in its bottom to permit escape of fluid therethrough as the mandrel 38 is lowered into the upper open end of the bowl.

The wellhead 20 is also provided with internal annular grooves 61, 62 and 63 which are aligned with and communicate with the upper lateral ports 21, 22 and 23 for a purpose to be described below.

The mandrel is also provided adjacent its upper end with external threads 65 by means of which blow-out preventers, guide pipes or the like may be releasably connected to the wellhead. The wellhead is also provided with an internal annular lock recess 68 which is provided with upper and lower inwardly divergent shoulders 69 and 70. A mandrel 72 is releasably disposed in the wellhead 20 by means of a plurality of circumferentially spaced lock dogs 73 which project outwardly through a plurality of spaced apertures 74 of the mandrel 72. The apertures 74 are enlarged inwardly as at 76 to provide shoulders against which the upper and lower flanges 78 and 79 of the dogs are adapted to abut to limit the outward movement of the dogs through the apertures 74.

The upper ends of the dogs are provided with downwardly and inwardly extending cam shoulders 80 which are adapted to be engaged by the upwardly and outwardly extending cam shoulder 82 at the lower end of a lock sleeve 84 telescoped in the enlarged upper portion of the mandrel 72. The lock sleeve 84 is initially held in an upper position above the dogs by a set screw 86 which is threaded in aligned bores in the mandrel 72 and the lock sleeve 84. The lowermost portion of the lock sleeve, however, projects into the inward path of movement of the upper ends of the dogs so that it limits inward displacement of the dogs 73 while permitting the dogs to be positioned in an inner retracted position wherein their outer portions do not project outwardly of the mandrel 72.

The lock sleeve is also provided with an external annular recess 88 in which is receivable a pin 89 slidably disposed in a lateral bore 90 of the mandrel above the dogs 73. The pin is biased inwardly by a spring 91 which is held in place by a snap retaining ring 94 suitably disposed in an internal annular recess of the bore 90. When the lock sleeve 84 is in its upper position, the pin 89 is received in the recess 96 of the lock sleeve below the annular recess 88 thereof, the upwardly and outwardly inclined shoulder 97 camming the pin outwardly upon downward movement of the lock sleeve in the mandrel.

The lock sleeve 84 is also provided with an internal recess 98 in which may be received operative elements of a running tool by means of which the lock sleeve and therefore the mandrel 72 may be lowered into and removed from the wellhead 20. The wellhead is provided adjacent its lower end with an internal upwardly facing annular shoulder 100 which is adapted to be engaged by the lower annular shoulder 101 of the mandrel 72 to limit the movement of the mandrel 72 into the wellhead 20.

It will now be apparent that the mandrel 72 may be lowered into position in the wellhead 20 by means of a suitable running tool which engages the downwardly facing shoulder 102a of the internal recess 98 of the lock sleeve 84 when the latter is in the upper position on the mandrel with the shear screw 86 holding the lock sleeve in the upper position. At this time the pin 89 is in the recess 96 of the lock sleeve 84 below the annular recess 88 thereof, the spring being compressed thereby against the retaining ring 94. When the mandrel telescopes into the wellhead 20, it moves downwardly therein until its lower shoulder 101 engages the upwardly facing shoulder 100 of the wellhead. Thus downward movement of the mandrel is arrested.

The lock sleeve 84 is then moved downwardly to the position shown in FIGURE 1 by means of downward jars imparted thereto through the running tool which causes the screw 86 to shear to permit such downward movement. During such downward movement, the cam shoulder 82 of the lock sleeve engages the cam shoulders 80 of the lock dogs 73 and cams the lock dogs outwardly into the lock recess 74 of the mandrel with which the dogs are aligned. The lock sleeve then moves to the position illustrated in FIGURE 1 and the pin 89 moves inwardly into the recess 88 to hold the lock sleeve against accidental upward displacement relative to the mandrel 72. The lock dogs 73 then prevent upward movement of the mandrel in the well head 20.

When it is desired to remove the mandrel 72 a suitable running tool for inserting and removing the mandrel, such as the running tool 102, is lowered into the mandrel 72 until the downwardly facing shoulder 116 thereof engages the upper end of the lock sleeve 84. The running tool 102 is provided with a mandrel 104 which is threaded into the sub 105 which provides a downwardly facing stop shoulder 103. The sub 105 may be connected by any suitable means to a pipe or tubing string by means of which the running tool may be lowered into the well.

A dog carrier sleeve 106 having upper and lower sections 107 and 108 releasably secured to one another by a shear screw 119 is slidably mounted on the mandrel 104. The upper section of the lock sleeve is provided with a plurality of circumferentially spaced apertures in which are movably received the lock dogs 109 which are adapted to move into the internal annular recess 98 of the lock sleeve 84. The lower lock sleeve section 108 is similarly provided with a plurality of circumferentially spaced apertures in which are movably disposed the lock dogs 110 which are receivable in the annular internal lock recess 68a of the mandrel 72.

Figure 7:
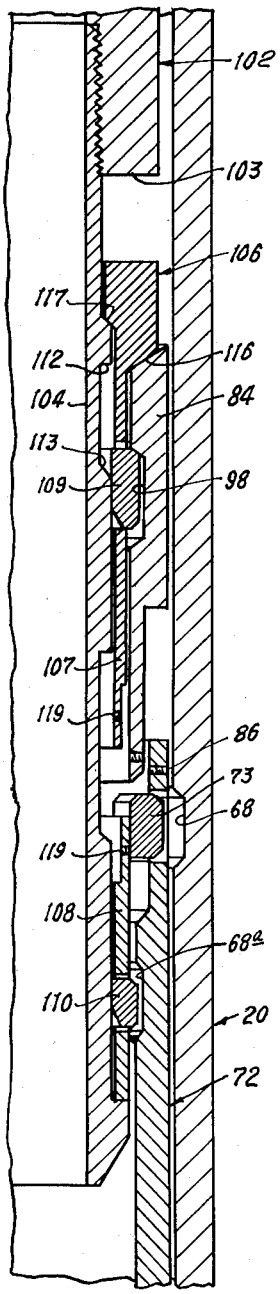
FIGURE 7 is a view similar to FIGURE 6 showing the running tool in an intermediate stage of the removal operations of the mandrel.
Figure 8:
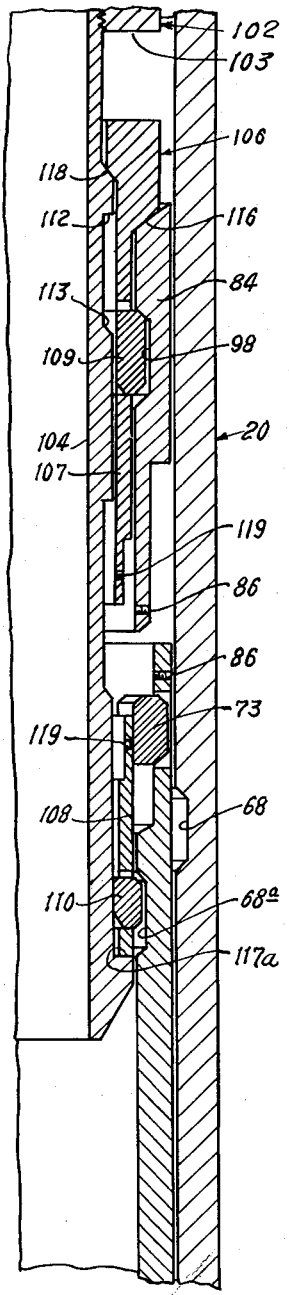
FIGURE 8 is a view similar to FIGURE 7 showing the well tool of FIGURE 7 as it appears when the mandrel it engages is being raised upwardly for removal.

The mandrel 104 is provided with an external annular recess 111 into which the upper lock dogs 109 may move inwardly toward retracted positions wherein they do not project outwardly of the dog carrier sleeve 106. The upper external annular recess 111 provides a downwardly facing shoulder 112 which engages the upper ends of the upper lock dogs 109 to limit upward movement of the dog carrier sleeve 106 relative to the mandrel 104 and with a downwardly and outwardly extending annular cam shoulder 113 which is adapted to engage the beveled cam shoulders 113a of the upper lock dogs 109 to cam them into the expanded positions indicated in FIGURE 7. The mandrel 104 is also provided with a lower external annular recess 114 into which the lock dogs 110 may move inwardly to the retracted positions indicated in FIGURE 6 and is also provided with a downwardly and outwardly extending cam shoulder 115 which is adapted to engage the cam shoulders 115a of the lower lock dogs 110 to cam them to the expanded positions indicated in FIGURE 8 upon upward movement of the mandrel 104 relative to the dog carrier sleeve 106. The dog carrier sleeve is provided with an enlargement at its upper end which provides a downwardly facing shoulder 116 which is adapted to engage the upper end of the lock sleeve 84 to limit downward movement of the dog carrier sleeve relative to the mandrel. The mandrel 104 is provided at its lower end with an enlargement which provides an upwardly facing annular stop shoulder 117a which is adapted to engage the lower end of the dog carrier sleeve 106. The mandrel 104 and the dog carrier sleeve 106 are provided with upwardly and downwardly facing shoulders 117 and 118, respectively, which engage upon upward movement of the mandrel relative to the upper dog carrier sleeve section 107 as shown in FIGURE 7. In this manner both the upper and lower dog carrier sleeve sections are caused to move upwardly with the mandrel 104 upon upward movement thereof even after the sections have been disconnected by the shearing of the shear screw 119.

Figure 6:
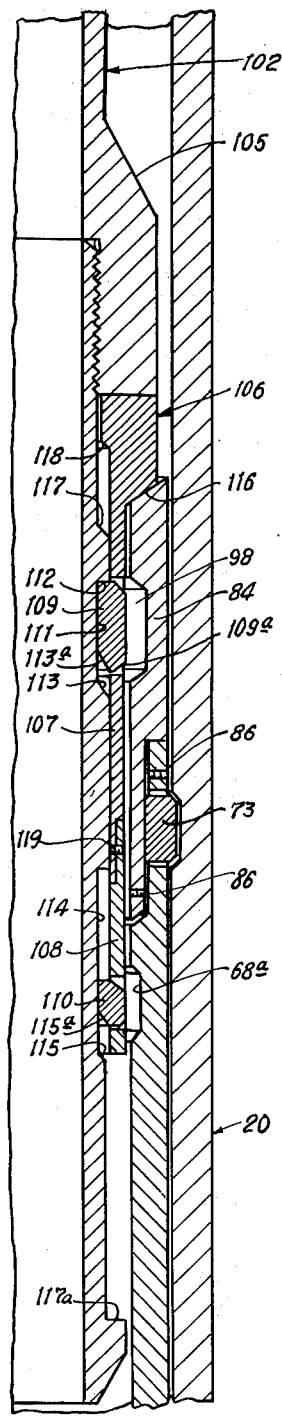
FIGURE 6 is a vertical partly sectional view showing a running tool for running the mandrels into and out of the well in one of the mandrels of the well tool system illustrated in FIGURES 1 through 4 showing the running tool as it appears while being lowered into operative position.

When it is desired to remove the mandrel 72 from the wellhead the running tool 102 is lowered into the well with all elements thereof in the positions indicated in FIGURE 6. The dog carrier sleeve 106 is held in the position indicated by the engagement of the upper ends of the lock dogs 109 with the downwardly facing shoulders 112 of the external annular recess 111 of the mandrel 104 when the dogs 109 encounter obstructions during downward movement of the running tool in the wellhead and are cammed inwardly by action of their cam shoulders 119a when the mandrel 104 moves downwardly relative to the dog sleeve to position the shoulder 113 thereof below the dogs 109.

The running tool is lowered into the well until its downwardly facing shoulder 116 engages the upper end of the lock sleeve 84 of the mandrel 72 whereupon further downward movement of the running tool is arrested and the dogs 109 and 110 are aligned with the recesses 98 and 68a, respectively, of the lock sleeve and of the mandrel 72. Upward force is then imparted through the running tool 102 to cause the mandrel 104 to move upwardly relative to the dog sleeve 106 and during such upward movement of the mandrel the cam shoulders 113 and 113a and the cam shoulders 115 and 115a coact to cause the dogs 109 and 110 to move into the expanded positions illustrated in FIGURES 7 and 8.

Further upward force is then imparted to the dog carrier sleeve 106 to cause the lock sleeve 84 to move upwardly relative to the mandrel 72. Since the mandrel 72 is still prevented from moving upwardly due to the engagement of the lock dog 73 thereof in the lock recess 68 of the wellhead, such upward force causes the shear screw 119 to shear whereby the upper section 107 of the dog sleeve is separated from the lower section 108 thereof and thus further upward movement of the running tool mandrel 104 causes the lock sleeve 84 to be moved upwardly relative to the dog mandrel 72 whereby its locking surface is moved out of engagement with the internal surfaces of the lock dog 73 of the mandrel which are then freed for movement toward retracted positions. Continued upward movement of the mandrel 104 then causes the upwardly facing shoulder 117a on the lower end thereof to engage the lower end of the lower section 108 of the dog carrier sleeve. Continued further upward movement of the mandrel then causes the lower section to move upwardly also and the mandrel lock dogs 73 then are cammed inwardly by the camming action between the upper beveled cam shoulders of the dogs and of the lock recess 68 of the wellhead. All elements of the running tool and of the lock sleeve 84 and mandrel 72 are in the positions indicated in FIGURE 8 whereby the mandrel may be moved upwardly and out of the wellhead 20.

The mandrel 72 is internally threaded as at its lower end whereby an outer well casing 120 may be secured thereto. The mandrel 72 is provided at its lower end with ports 121, 122 and 123 which, when the mandrel is secured in the wellhead 20, communicate with the ports 21, 22 and 23, respectively, of the wellhead. The ports 121, 122 and 123 of the mandrel 72 communicate with external annular recesses 124, 125 and 126, respectively, of the mandrel and are aligned with the internal annular recesses 61, 62 and 63, respectively, of the wellhead.

The mandrel 72 is also provided with external seal recesses 128, 129, 130 and 131, which seal between the mandrel 72 and the wellhead 20 above and below the ports 121, 122 and 123. A longitudinal passage 133 extends through the mandrel and has its lower end closed by a plug 134 which is welded in the lower end thereof. The flow passage 133 has lateral branches 135, 136, 137 and 138 which communicate with the seal recesses 128, 129, 130 and 131, respectively, and with a branch 140 which communicates with the interior of the mandrel.

A valve sleeve 142 is slidably positioned for limited longitudinal movement in the mandrel, such longitudinal movement being limited by the upwardly facing shoulder 143 of the mandrel and the downwardly facing shoulder 144 of a stop sleeve 145 rigidly secured in the mandrel by any suitable means, as by welding. The stop sleeve 145 is provided with a lateral port 146 which communicates with the port 123 of the mandrel 72 so that the ports 23 and 123 of the wellhead and of the mandrel afford communication between the interior of the mandrel and the lateral conduit 28 of the wellhead.

The valve sleeve 142 is provided with a lateral flow port 148 which opens into an external annular recess 149 of the valve sleeve aligned with the external opening of the lateral branch 140 of the flow passage 123 when the valve sleeve is in an upper position. The valve sleeve may be engaged by a suitable running tool which seals above and below internal recess 150 of the valve sleeve and through which a sealing fluid may be injected into the internal recess 150, thence through the lateral flow port 148 to the external recess 149 of the valve sleeve, and thence through the lateral branch 140 of the flow passage 133 and through the flow passage 133 and the lateral branches 135, 136, 137 and 138 thereof into the seal recesses 128, 129, 130 and 131, respectively. The running and injecting tool of course is connected to the surface through a suitable thin pipe whereby the sealing fluid may be injected into the passage 133 from a remote location, such as the surface of the body of water in which the wellhead is submerged. The sealing fluid exerts a pressure on the seal means 158, 159, 160 and 161 which are disposed in the seal recesses 128, 129, 130 and 131, respectively, to force the seals into tighter, more effective sealing engagement with the internal wall of the wellhead 20. The sealing fluid may be of a time setting type such as cement or the like, which hardens with the passage of time.

After the sealing fluid has been injected into the flow passage 133, downward jars are imparted by the running tool to the valve sleeve 142 to move it downwardly to the position shown in FIGURE 1 wherein a snap ring 163, which is located in an annular recess of the valve sleeve, expands into an internal recess of the mandrel to retain the valve sleeve in the lower position.

The valve sleeve is provided with external seal recesses in which are disposed O rings or other seal means 165, 166, and 167. It will be apparent that when the valve sleeve is in its upper position the O rings 166 and 167 seal between the valve sleeve and the mandrel on opposite sides of the flow port 148 and of the lateral branch 140 of the flow passage 133 so that any sealing fluid which flows through the flow port 148 will not flow outwardly between the valve sleeve and the mandrel but will be directed into the lateral branch 140 of the flow passage 133. When the valve sleeve is moved into the lower position shown in FIGURE 1, the O rings 165 and 166 similarly seal between the valve sleeve and the mandrel on opposite sides of the lateral branch 140 of the flow passage 133 and prevent leakage of the sealing fluid from the flow passage 133 into the mandrel 72. In this manner, when the mandrel is locked in its operative position in the wellhead 20, the sealing means or assemblies 158, 159, 160 and 161 are caused to seal very tightly and effectively between the mandrel and the wellhead above and below each of the aligned pairs of the lateral ports of the mandrel and of the wellhead.

The mandrel 72 has an internal configuration exactly similar to that of the wellhead and in order to facilitate description, like elements of the mandrel are provided with the same reference numeral, to which the subscript "a" has been added, as the corresponding elements of the wellhead. Another mandrel 72b which is of exactly the same configuration as the mandrel 72, except that it is provided with one less port than the mandrel 72, may be removably positioned in a like manner in the mandrel 72. For example, the mandrel 72b is provided with an internal lock recess 68b, identical in all respects with the lock recess 68a of the mandrel 72, in which the lugs 73b of the intermediate mandrel 72b may extend to lock the mandrel 72b in the outer mandrel 72 when the lock sleeve 84b is moved into its lowermost locking position. The intermediate and inner mandrels 72b and 72c are similarly identical in construction with the mandrel 72a except that the intermediate mandrel 72b has one less lateral port than the mandrel 72a, not having the lateral port 123. The inner mandrel 72c in turn has one less lateral port than the mandrel 72b, not having a port corresponding to the ports 122b and 122 of the mandrels 72b and 72a.

The mandrels 72b and 72c support intermediate and inner casings 120b and 120c, respectively.

An inner tubing 120d is connected at its upper end to a mandrel 170 whose downwardly facing shoulder 171 rests on the upwardly facing shoulder 100c of the inner mandrel 72c and is provided with locking dogs 173 which extend through circumferentially spaced apertures 174 of the mandrel 170 into the lock recess 73c of the inner mandrel 72c when it is properly positioned in the mandrel 72c.

The lock sleeve 175 is provided with an inwardly and upwardly extending cam shoulder 176 which engages the inwardly and downwardly extending cam shoulders 177 of the dogs 173 to cam them outwardly to their locking positions. The lock sleeve 175 also has an external flange 180 having an upwardly facing shoulder 181 which is adapted to engage a downwardly facing shoulder 183 provided by an upper tubing extension 188. The tubing extension is secured at its lower end by a threaded engagement with the mandrel 170 to cause the mandrel 170 and the tubing 120 to be removed with the mandrel when the external flange 190 of the lock sleeve 175 is engaged by a suitable running tool whereby an upward force may be exerted thereon to first move the lock sleeve out of locking engagement with the dogs 173. The dogs are then free to be cammed inwardly by the shoulders 69c of the inner mandrel 72c. The lock sleeve then engages the shoulder 183 whereby both the mandrel 170 and the tubing 120d are removed with the lock sleeve. The mandrel 170 is provided with an external seal recess 194 in which is disposed a packing or seal 195 which seals between the mandrel 170 and the mandrel 72c above the port 121c.

It will now be seen that a well tool system has been illustrated and described which includes a wellhead 20 in which a plurality of mandrels 72a, 72b, 72c and 170 may be successively telescoped to form cylindrical passages 200, 201, 202 and 203 which are in communication at their upper portions with the lateral conduits of the wellhead 29, 28, 27 and 26, respectively, through the aligned lateral ports of the mandrels and of the wellhead, so that well fluids may be transported from such cylindrical passages to the exterior of the wellhead and thence to the surface of the water or to some other remote location through the conduits 48, 49, 50 and 51. Conversely, various fluids or chemicals for treating the well may be selectively pumped into such cylindrical passages through the conduits 48, 49, 50 and 51. In addition the internal tubing 120d provides a flow passage to the surface through its upper extension 188.

It will be apparent that the mandrels 72a, 72b, 72c and 170 may be successively lowered into and secured to the wellhead. The mandrel 72a of course is first lowered into the wellhead and locked therein by downward movement of its lock sleeve 84. Sealing fluid is then injected into its flow passage 133 by means of the valve sleeve 148 which is then moved to its lower closed position. The next mandrel 72b is then lowered into the mandrel 72a and its lock sleeve 84b is moved downwardly to force its locking dogs 73b to move outwardly into the lock recess 68a of the mandrel 72a. The valve sleeve 148b is positioned to permit sealing fluid to be injected into its flow passage 133b and thence to its seal recesses 128b, 129b and 130b, to cause the packing or seals 158b, 159b and 160b to firmly and effectively seal between the mandrels 72a and 72b above the lateral port 123 of the mandrel 72a and above and below the lateral ports 122 and 122a, and the lateral ports 121 and 121b. The valve sleeve is then moved to its lower closed position.

Similarly, the mandrel 72c is then lowered downwardly into the intermediate mandrel 72b and its lock sleeve 84c is moved downwardly to force its locking dogs 73c to move outwardly into the lock recess 68b of the intermediate mandrel 72b. Sealing fluid is then injected into the flow passage 173c of the mandrel 72c to cause the packers or seals 158c and 159c to seal between the mandrels 72c and 72b above the lateral port 122c and above and below the lateral ports 121b and 121c. The valve sleeve 148c is then moved to its closed position and the innermost mandrel 170 may then be similarly lowered into the inner mandrel 72c.

When it is desired to remove the well casings, the process is reversed. The innermost mandrel 170 is first removed by a suitable running tool which engages the external flange 190 of the lock sleeve 175 to cause it to move upwardly relative to the mandrel 170 to free the lugs 173 for movement to their inner retracted positions. Further upward movement of the running tool then causes the shoulders 181 and 183 of the lock sleeve 175 and of the tubing extension 188 to engage whereby further upward movement of the running tool removes the mandrel 170 and the tubing 120d from the wellhead. A suitable running tool is then inserted into the wellhead to engage in the recesses 98c and 68c of the lock sleeve 84c and the inner mandrel 72c whereupon the lock sleeve is first moved upwardly thereby to free the dogs 73c for inward movement to retracted positions and then the further upward movement of the running tool causes the mandrel 72c also to move upwardly as was explained above. The mandrels 72b and 72c are then similarly and successively removed.

It will now be seen that a new and improved well tool assembly has been illustrated and described which includes an outer tubular member, such as the wellhead 20, in which a plurality of mandrels may be successively telescoped to support well casing or other well tools in the tubular member.

It will further be seen that the mandrels and the well tools supported thereby are easily removable from the tubular member by upward movement imparted thereto.

It will further be seen that a mandrel has been provided which has sealing means disposed in annular recesses thereof and that a flow passage is provided in the mandrel through which sealing fluid may be injected into the seal recesses to force the seal means into very fluid tight sealing engagement with any tubular member in which the mandrel may be disposed.

It will further be seen that the flow passage may be connected at the interior of the mandrel with a fluid injecting means and that the mandrel may be provided with a valve, such as the valve sleeves 148, 148b and 148c, to close such flow passage after the sealing fluid has been introduced thereinto.

It will further be seen that the sealing fluid may be of a time setting type whereby it hardens after injection to firmly hold the seal means in sealing position.

It will further be seen that the tubular member and the mandrels are provided with aligned ports whereby fluids may be transmitted between the annuli or cylindrical flow passages provided by the well casing 210 connected to the lower end of the wellhead and the well casings or tubings 120, 120b, 120c and 120d.

It will further be seen that the mandrels which support the well tubings are provided with sealing means which seal between the mandrels to prevent commingling of fluids flowing through the various cylindrical flow passages 200, 201, 202 and 203.

Figure 9:
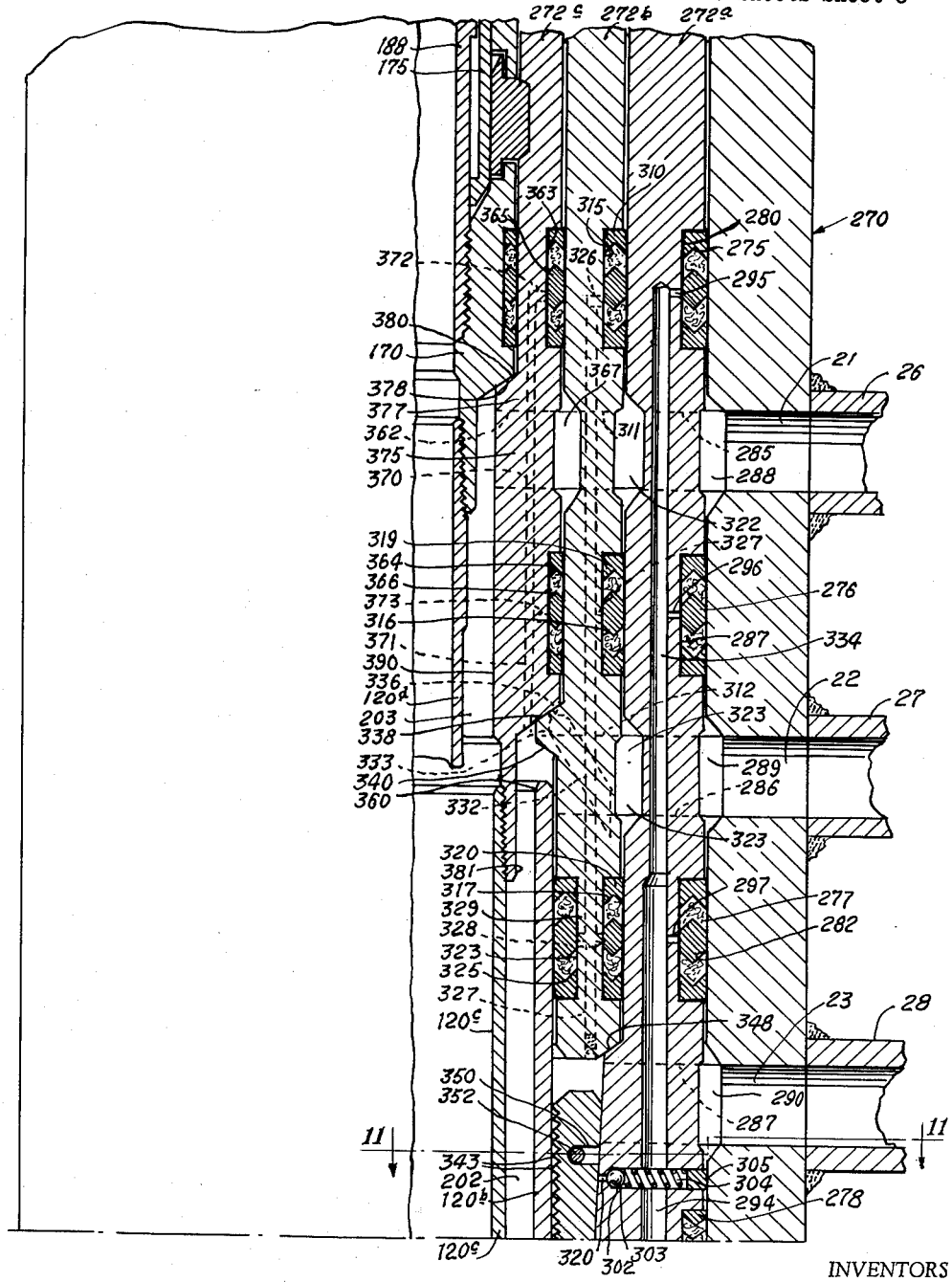
FIGURE 9 is a vertical partly sectional view of an intermediate portion of a well tool system showing a modified form of the mandrels by means of which the well casings are releasably connected to a wellhead.
Figure 10:
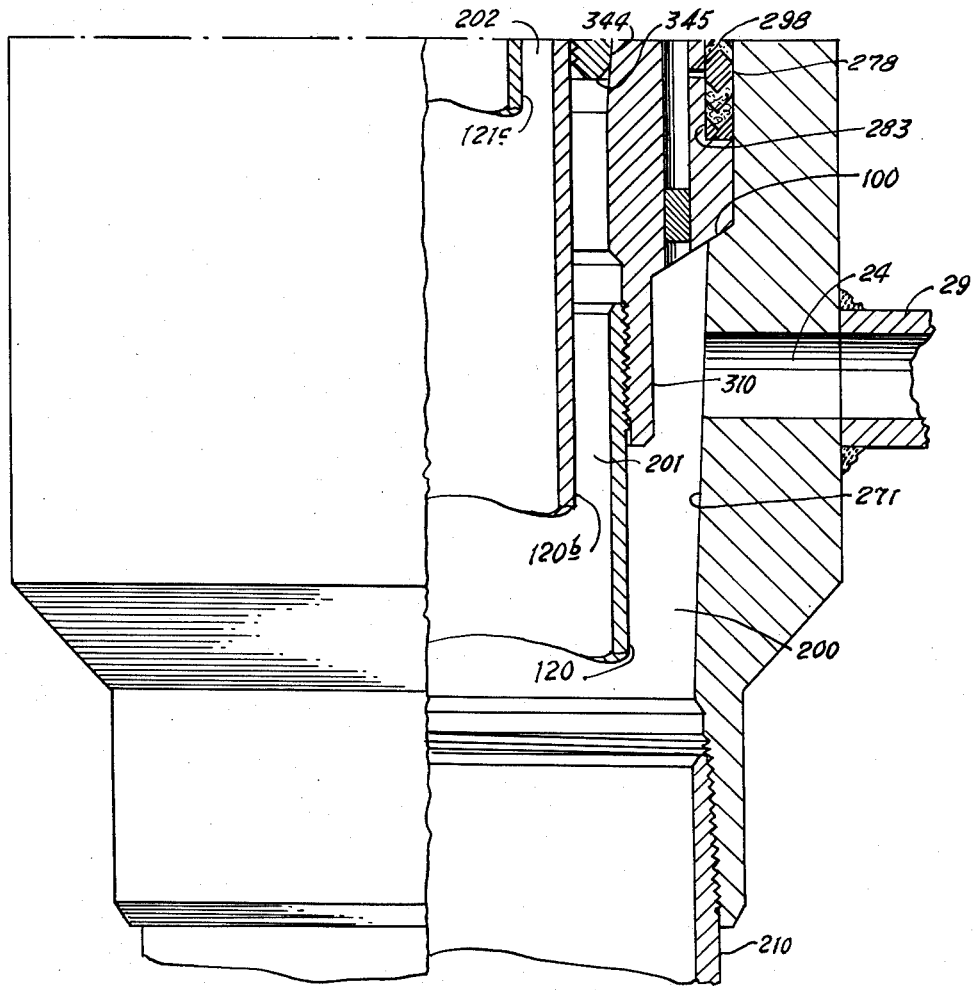
FIGURE 10 is a view similar to FIGURE 9, being a continuation thereof, showing lower portions of the mandrels in the wellhead.
Figure 11:
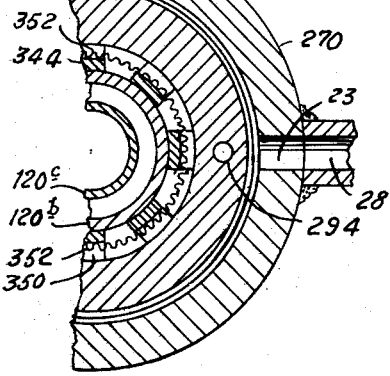
FIGURE 11 is a sectional view taken on line 11—11 of FIGURE 9.

In FIGURES 9, 10 and 11 is illustrated another well tool system employing modified forms of the wellhead and of the mandrels by means of which the well casings 120, 120b and 120c are releasably secured in the wellhead. The wellhead 270 is similar in all respects to the wellhead 20 except that its internal wall 271 below the upwardly facing shoulder 100 slopes downwardly and inwardly to provide a wedge engaging surface for a purpose to be described below. The mandrel 272a is provided with the usual locking dogs, such as the locking dogs 73 of the mandrel 72, illustrated in FIGURE 1 and with packer assemblies or seals 275, 276, 277 and 278 which are disposed in external recesses 280, 281, 282 and 283. The packer assemblies seal between the mandrel 272a and the wellhead 270 above and below the lateral ports 21, 22, 23 and 24 of the mandrel of the wellhead 270 and the lateral ports 285, 286 and 287 of the mandrel 272a. The upper three lateral ports of the wellhead and the three lateral ports of the mandrel 272a communicate with annular flow passages 288, 289 and 290 which are formed by opposed internal and external recesses in the wellhead and the mandrel 272a in the same manner as in the well tool system disclosed in FIGURES 1 through 5.

The mandrel 272a is provided with a longitudinal flow passage 294 which has communicating lateral branches or ports 295, 296 and 297 which open respectively into the seal recesses 280, 281, 282 and 283. An inlet opening which opens into the interior of the mandrel is enlarged intermediate its ends to form a valve seat 302 and a check ball valve 303 is positioned therein and biased towards the valve seat by a spring 304. The opposite open end of the enlarged portion of the opening 300 is closed by a plug 305 which may be rigidly secured in the opening in any suitable way, as by welding.

It will be apparent that after the mandrel 272a is located and locked in position in the wellhead 270, a suitable running tool may be lowered on a string of thin conduit or pipe to inject a sealing fluid into the flow passage 294 and therefore into the external seal recesses of the mandrel 272a. Such injection tool is of course provided with means for sealing with the mandrel above and below the inlet 300. The sealing fluid is then pumped or injected from the surface through the running or injecting tool into the inlet 300, the check ball valve being displaced from its valve seat 302 to permit flow of the sealing fluid into the longitudinal passage 294. The ball valve of course prevents reverse flow of the sealing fluid through the inlet 300. The sealing fluid as previously described is a time setting fluid which sets or hardens behind the seal or packing members disposed in the seal recesses of the mandrel 272a to effect a very strong seal between the mandrel and the wellhead.

The outer casing 120 is secured to an internally threaded lower end 310 provided on the lower end of the mandrel 272a. Intermediate mandrel 272b is identical in all respects with the mandrel 272a except that it is of course smaller in cross sectional dimension and also does not possess a lower end portion such as the lower end portion 310 of the mandrel 272a by means of which a well casing could be secured thereto for reasons to be developed below and because it is provided with an internal seal recess 310. Intermediate mandrel 272b is similarly provided with lateral ports 311 and 312 which are aligned with the lateral ports 285, 286 and 287 of the outer mandrel 272a. External sealing recesses 315, 316 and 317 are provided on the mandrel 272b in which are disposed the packers or seals 318, 319 and 320, respectively, which are adapted to seal between the outer and intermediate mandrels and on opposite sides of the ports 311 and 312. The ports 311 and 312 open into annular passages 322 and 323 formed by internal annular recesses of the outer mandrel 272a and by external annular recesses in the intermediate mandrel 272b. The packer or seal 325 in the internal annular seal recess 324 of the intermediate mandrel is adapted to seal between the intermediate mandrel and the intermediate well casing as will be explained below.

The intermediate mandrel is provided with a longitudinal flow passage 327 whose lower end is closed by a suitable plug welded or otherwise secured to the mandrel and which has lateral branches or ports 326, 327, 328 and 329 which open into the seal recesses 315, 316, 317 and 324, respectively. The sealing fluid may be admitted to the flow passage 327 through a diagonal inlet bore 332 which intersects and communicates with the flow passage 327. The bore is reduced adjacent its upper end to form a valve seat for the ball check valve 333 which is biased toward such seat by a spring disposed in the bore 332. The opposite end of the bore is closed by a suitable plug 334 which is welded or otherwise secured in the bore. The upper reduced inlet end of the inlet bore 336 extends through the upper shoulder 338 of an external flange 340 of the intermediate mandrel.

It will be apparent that sealing fluid may be injected into the inlet bore and thence into the flow passage 327 to flow into the seal recesses of the intermediate mandrel to cause the seals to move out tightly and firmly against the outer mandrel 272a and against the intermediate casing 120b. The ball check valve of course prevents escape of the sealing fluid from the flow passage 327.

The intermediate casing 120b is shown held in position by a plurality of wedges 342 which have serrations or teeth 343 on their inner surfaces and whose outer surfaces 344 extend downwardly and inwardly at substantially the same angle as the downwardly and inwardly inclined surface 345 of the inner mandrel below the internal shoulder 348. The wedges are provided with transverse slots 350 in which a resilient ring 352 is disposed to hold the wedges 342 resiliently against the intermediate casing 120b. The resilient wedges are inserted in the outer mandrel 272a and above the upper end of an intermediate casing 120b in the event that the intermediate casing becomes stuck in the well when it is being lowered thereinto by a mandrel of substantially the same configuration as the mandrel 272b except that it is provided with a lower connecting portion such as the portion 310 of the outer mandrel 272a. When such casing has become stuck in the well its upper end is cut off by the use the suitable casing cutting tool lowered into the well as at 360. The mandrel by means of which the intermediate casing has been lowered into the well is then removed from the well and the wedges 342 slipped downwardly into the well and pushed into the space between the tapered surface or inclined surface 345 of the outer mandrel 272a and the outer surface of the intermediate casing 120d. The serrations 343 bite or dig into the outer surface of the intermediate casing 120d to rigidly hold it immovably relative to the outer mandrel 272a. It is desirable to lock such stuck casing against movement since it otherwise may buckle or collapse due to its own weight if its upper end is not supported.

In the event that when the outer mandrel 272a and the outer casing 120 became stuck, a similar procedure would have been followed. A set of wedges similar to wedges 342 but of larger size would have been lowered into the well to wedge between the inwardly and downwardly inclined surface 271 of the wellhead and the outer casing 120 to hold the casing 120 immovably in place after the upper end of such stuck outer casing had been cut off and removed by a suitable casing cutting tool lowered into the well. In that event, a mandrel 272a lacking the lower connecting portion 310 but provided with an internal packer or seal such as the packer or seal 325 of the intermediate mandrel 272b would have been inserted in place of the mandrel 272a.

The inner mandrel 272c is similar in all respects to the mandrel 272a except that it is provided with only a single lateral port 362 which communicates with the lateral port 311 of the intermediate mandrel 272b and has only a pair of external seal recesses 363 and 364 in which are disposed the packers or seals 365 and 366, respectively, which seal between the intermediate and inner mandrels above and below the port 362. The port 362 communicates with an annular passage 367 which is formed by an internal annular recess of the intermediate mandrel and an external recess of the inner mandrel. The inner mandrel is provided with a seal fluid flow passage 370 whose lower end is closed by a suitable plug 371 and which is provided with lateral branches or ports 372 and 373 which open into the seal recesses 363 and 364. A diagonal inlet bore 375 intersects and communicates with the flow passage 370 and is provided with a ball check valve 377 which seats against a valve seat provided by a constriction in the bore of the inlet aperture, the reduced inlet 378 opening to the upwardly facing shoulder 380 of the mandrel. The lower end of the bore 375 is of course closed by a suitable plug and a spring is disposed between the plug and the ball check valve to bias the ball check valve towards its seat.

It will be apparent that a sealing fluid may be admitted to the flow passage through the inlet bore in the same manner as seal fluid is admitted to the flow passage 327 of the intermediate mandrel 272a to cause the packers or seals 365 and 366 to seal very tightly and effectively between the intermediate and inner mandrels 272b and 272c. The inner mandrel 272c is of course provided with the lower connection portion 381 by means of which the inner casing 120c may be secured to the mandrel. The innermost mandrel 170 is identical in all respects to that shown and described in FIGURES 1 and 2 and of course supports the innermost tubing 120d.

It will be apparent that the mandrels 272a, 272b and 272c are sequentially secured in and removed from the wellhead 270 in the same manner as the mandrels illustrated in FIGURES 1 through 5 and that ordinarily the intermediate mandrel 272b is of exactly the same type as the mandrels 272a and 272 illustrated in FIGURES 6 and 7.

It will also be apparent that in the event that any one of the casings 120, 121b or 121c becomes stuck in the well that a mandrel of the same type as the mandrel 272b may be employed to seal above and below the various ports of the mandrels after the set of wedges 342 has been inserted to lock such stuck casing rigidly in place against undesired movement.

It will further be seen that the inner mandrel 272c is also provided with an inwardly downwardly tapered surface 390 below its shoulder 378 to serve the same purpose in the event that the innermost casing 120d became stuck in the well prior to assuming its proper position shown in FIGURE 6.

It will further be seen that the flow passages through which the sealing fluid, which may be of a time setting type as previously discussed, may be applied to the various packer assemblies or seals to cause the seals to be placed under compression and thus effect a better seal between adjoining mandrels. It will be further seen that the flow passages have been provided with check valves which permit flow of fluid into the flow passages but prevent outward flow thereof.

It will also now be seen that the lateral conduits 26, 27, 28 and 29 are connected by the various aligned lateral ports of the mandrels and of the wellhead with the cylindrical flow passages 203, 202, 201 and 200, so that fluids may flow out of such cylindrical flow passages to the lateral conduits of the wellhead or from the lateral conduits to such cylindrical flow passages as may be desired.

The well tool system illustrated in FIGURE 12 includes a wellhead 370 similar in all respects to the wellhead 270 shown in FIGURE 6 having a similarly upwardly and downwardly sloping surface 371 below the shoulder 374. The seal surfaces 377, 378, 379 and 380, however, slope inwardly and downwardly so that the seal surface 377 is of greater diameter than the seal surface 378. The internal diameter of the seal surface 378 is in turn greater than the diameter of the seal surface 379 which in turn has an internal diameter greater than the diameter of the seal surface 380.

The mandrel 390a is provided with a lateral port 392 which communicates with the lateral port 21 of the wellhead through the annular passage 393 formed by an external recess of the mandrel 390 and an internal recess of the wellhead, a lateral port 394 which communicates with the lateral port 22 of the mandrel by means of the annular passage 395 similarly formed between the wellhead and the mandrel, and a port 396 which communicates with the lateral port 23 of the mandrel through an annular passage 397 similarly formed between the mandrel and the wellhead.

An intermediate mandrel 390b is similarly provided with lateral ports 400 and 401 which communicate with the ports 392 and 393 of the outer mandrel 390a by means of the annular passages 402 and 403 provided by internal annular recesses of the mandrel 390a and external recesses of the mandrel 390b.

The upper ends of the mandrels 390a and 390b are provided with the same type of locking lugs and locking sleeves as the mandrels of the well tool system illustrated in FIGURE 1 whereby the mandrels are secured against both upward and downward movement relative to the wellhead and to each other after the mandrel 390a has had its downward movement in the wellhead stopped by the upwardly facing shoulder 374 of the wellhead and the mandrel 390b has had its downward movement in the outer mandrel 398 stopped by the upwardly facing shoulder 405 of the outer mandrel.

The mandrels are provided with lower connecting portions 407 and 408, respectively, by means of which the outer and intermediate well casings 120 and 120b are secured thereto.

A seal and scraper assembly 410 is rigidly secured to the lower end of the mandrel 390a and includes an annular sleeve 412 telescoped on the lower end of the mandrel whose upper end abuts a downwardly facing shoulder 413 thereof. The sleeve 412 may be rigidly secured to the lower end of the mandrel by any suitable means, as by a weld 414. The assembly 410 is provided with an annular external recess 415 adjacent its lower end in which a scraper spring 416 is disposed. The spring 416 may flex inwardly into the external recess 415 as the mandrel is moved downwardly through the wellhead, the outer surfaces of the scraper spring 416 scraping and cleaning the seal surfaces during such downward passage of the mandrel through the wellhead.

The scraper spring 416 is held in place against displacement in the annular recess 415 by a pair of retainer rings 418 and 419 which are secured to the seal assembly sleeve 412 on opposite sides of the annular recess 415 by any suitable means, as by welds.

The assembly sleeve is also provided with an external flange 420 which separates a pair of gas seals 421 and 422 which encircle the seal assembly 412 and which are held against lateral displacement on the sleeve by a pair of retainer rings 424 and 425, respectively, which are rigidly secured on opposite sides of the external flange 420 by any suitable means, as by welds. The gas seals may be circular annular tubular members, metal, rubber or other resilient substance having annular internal sealed passages 426 which are filled with pressurized gas prior to being sealed. The gas seals 421 and 422 normally have external diameters which are somewhat larger than the width of the external sleeve 420 and of the retainer rings 424 and 425 so that they tend to project outwardly thereof. Similarly, the gas seals have an outside diameter which is somewhat larger than the internal diameter of the seal surface 380 of the wellhead 370 so that when the outer mandrel 390a is disposed in the wellhead 370 in the position illustrated in FIGURE 12 wherein its downward movement is arrested by the shoulder 374 of the wellhead, the gas seals engage the seal surface and seal between the outer mandrel and the wellhead surface 380.

The outer mandrel is provided with a similar gas seal assembly 430 above its port 396 which includes a gas seal sleeve 431 whose upper end abuts the downwardly facing shoulder 432 of the mandrel and is held in rigid engagement therewith in any suitable manner, as by a weld 433. The seal assembly sleeve 431 is also provided with an intermediate external flange 434 on opposite sides of which are provided the gas seals 436 and 437 which are held against displacement from the sleeve by the retainer rings 438 and 439 disposed on opposite sides of the external flange 434 and secured thereto in any suitable manner, as by welds. As is seen, the diameters of the gas seals 436 and 437 are larger than the external diameters of the gas seals 421 and 422 so that they engage and abut the seal surface 379 of the wellhead between the ports 22 and 23 thereof.

A similar seal assembly 450 is disposed on the outer hanger mandrel 390a between the lateral ports 392 and 394 of the outer mandrel and includes the sleeve 451 which abuts a downwardly facing shoulder 452 of the outer mandrel and is held on the outer mandrel by the weld 453. The external flange 455 and the retainer rings 456 and 457, which are secured to the sleeve by welds, retain in place the gas seals 460 and 461 which are of larger diameters than the gas seals 436 and 437 and the diameter of the seal surface 378 of the mandrel whereby the gas seals seal between the surface 378 of the wellhead 370 and the outer mandrel 398.

A similar seal assembly 470 is disposed on the outer mandrel 398 above the lateral port 392 thereof and includes a seal sleeve 472 whose upper end engages the downwardly facing shoulder 493 of the outer mandrel and which is secured to the outer mandrel in seal tight relationship by any suitable means such as the weld 494. The seal sleeve 472 is provided with the external flange 476 and the retainer rings 477 and 488, which are secured thereto by any suitable means, such as welds, to hold thereon the metallic gas seals 482 and 483. The gas seals 482 and 483 have external diameters which are slightly larger than the diameters of the retaining rings and of the external flange 476 and also of the seal surface 377 so that when the outer mandrel 390a is in the position illustrated in FIGURE 12, the gas seals 482 and 483 seal between the outer mandrel and the well-head above the lateral port 392.

Figure 12:
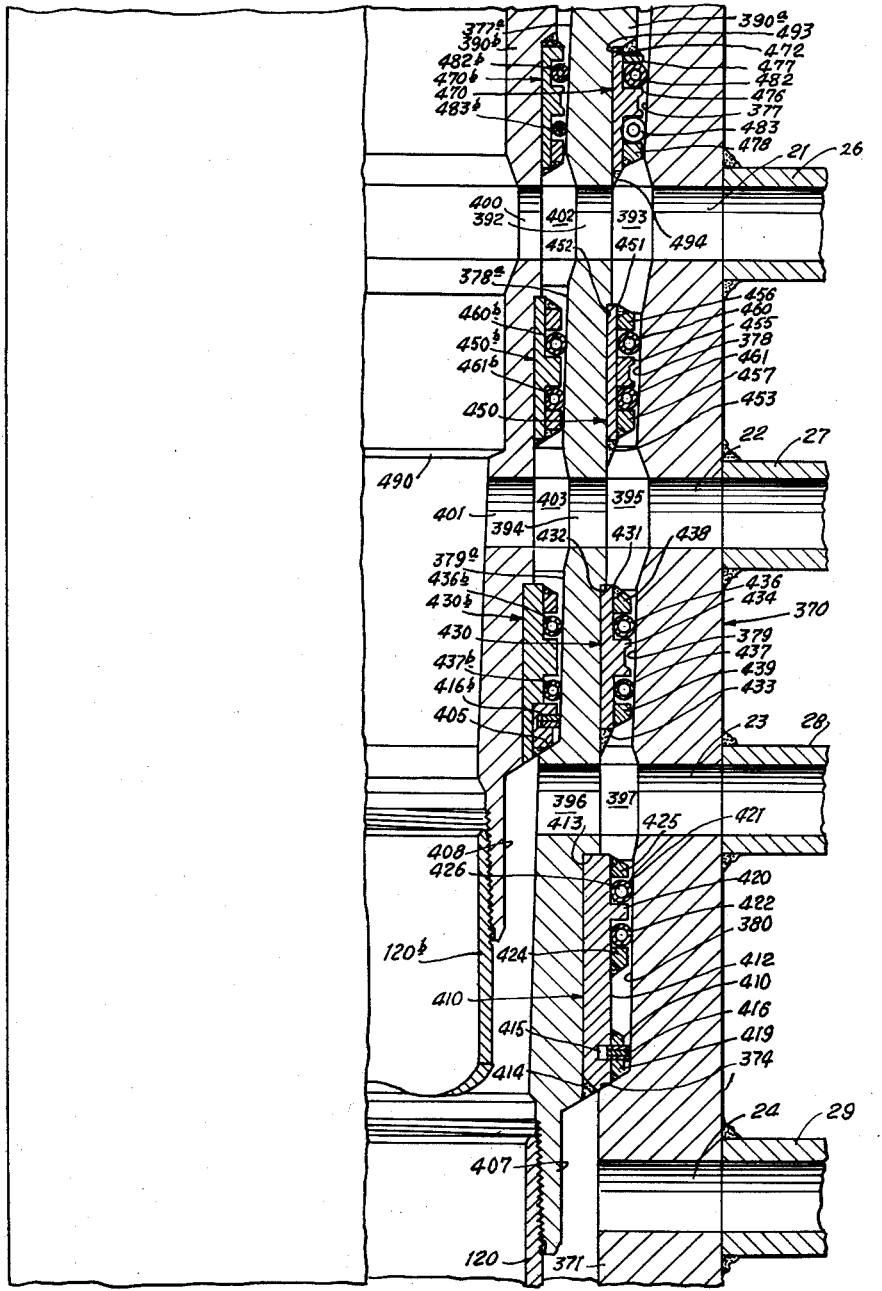
FIGURE 12 is a vertical partly sectional view of an intermediate portion of another well tool system showing another modified form of the mandrels and a different form of seal means for sealing therebetween.

It will now be seen that the outer mandrel has been provided with sealing means which seal between the mandrel and the wellhead on opposite sides of the lateral ports thereof and that the scraper spring ring 416 cleans or scrapes the seal surfaces of progressively smaller diameter of the wellhead as the outer mandrel descends through the wellhead to its operative position illustrated in FIGURE 12.

The intermediate mandrel 390b has gas sleeve seal assemblies 470b, 450b and 430b which have exactly the same elements as the seal assemblies 470, 450 and 430 of the outer mandrel 390a and therefore corresponding elements of such seal assemblies have been provided with similar reference characters to which the subscript "b" has been added. It will also be seen that the outer mandrel 390a is provided with seal surfaces 377a, 378a and 379a which are of progressively smaller diameters and which are engaged respectively by the seal rings 482b and 483b of the seal assembly 470b, by the seal rings 460b and 461b of the seal assembly 450b, and by the seal rings 436b and 437b of the seal assembly 430b which seal on opposite sides of lateral ports 400 and 401 of the inner mandrel. It will be apparent that the next or inner mandrel which may be seated on the shoulder 490 of the intermediate mandrel 390b may be similarly constructed but would be provided with only a single pair of seal assemblies which would seal between such inner mandrel and the mandrel 390b above and below the lateral port 400.

It will now be seen that the internal intermediate mandrel 390b of course is provided with seal surfaces 377b and 378b which incline downwardly and inwardly so that the seal surface 377b is of smaller diameter than the seal surface of 378b.

It will now be seen that in FIGURE 12 still another well tool system has been illustrated and described which includes an outer tubular member or wellhead 370 and a plurality of mandrels 390a and 390b which are telescoped therein and which support well tools, such as the well casings 120 and 120b, in the outer tubular member or mandrel 370. It will further be seen that the mandrels and the wellhead are provided with aligned lateral ports which provide communication with the lateral conduits 26, 27, and 28 whereby fluids may be transmitted between such conduits and the cylindrical flow passages, such as the cylindrical passages 200 and 201 between the well casings. It will further be seen that the wellhead and the hanger mandrels are provided with internal sealing surfaces which are of progressively smaller diameters, each sealing surface being of smaller diameter than its next upper seal surface and that the mandrels are provided with sealing means which engage such seal surfaces above and below the lateral ports to seal between such mandrels, and between the outermost mandrel and the wellhead, above and below the lateral ports.

It will further be seen that the mandrels are provided with surface cleaning means such as the scraper springs 416 for cleaning the seal surfaces of the wellhead and of the mandrels whereby proper seals are effected by the seal assemblies of the mandrels.

It will now be seen that three different well tool systems have been illustrated and described each of which includes an outer tubular member, such as a wellhead, in which a plurality of hanger mandrels are removably telescoped.

It will further be seen that the wellhead is provided with a plurality of lateral ports, some of which are aligned with suitable lateral ports of the mandrel whereby communication is provided between the lateral ports of the wellhead and the tubular or cylindrical flow passages between the well casings connected to the lower ends of the wellhead and of the mandrels.

It will further be seen that the hanger mandrels are provided with releasable lock means which hold the hanger mandrels rigidly against accidental displacement in the wellhead or in the other mandrels in which they may be situated.

It will further be seen that the tubular mandrels are provided with seal means which seal above and below such aligned lateral ports of the wellhead and of the mandrels.

It will further be seen that in the well tool systems illustrated in FIGURES 1 through 8 of the drawing, the mandrels are provided with flow passages by means of which a sealing fluid may be injected into the seal recesses in which packer assemblies or seals are disposed to place such seals under pressure to effect a very tight and effective seal between such mandrels and the surfaces which the seals engage.

It will further be seen that in the well tool system illustrated in FIGURE 10, the mandrels are provided with seal assemblies having metallic tubular annular pressurized seals and that the wellhead and the mandrels are provided with internal seal surfaces which decrease in diameter with a longitudinal position in the wellhead or the mandrels so that gas seals of progressively larger diameters are provided on upper portions of the mandrels to effect the sealing between the mandrels and such surfaces.

It will further be seen that in the well tool system illustrated in FIGURES 9, 10, 11 and 12, the wellhead and the mandrels are provided with inwardly and downwardly sloping surfaces below the lowermost lateral port of each wellhead or mandrel whereby stuck casing may be rigidly locked in position by wedge members having internal serrations or teeth which may be placed between such inclined surfaces and such stuck casings.

Figure 2:
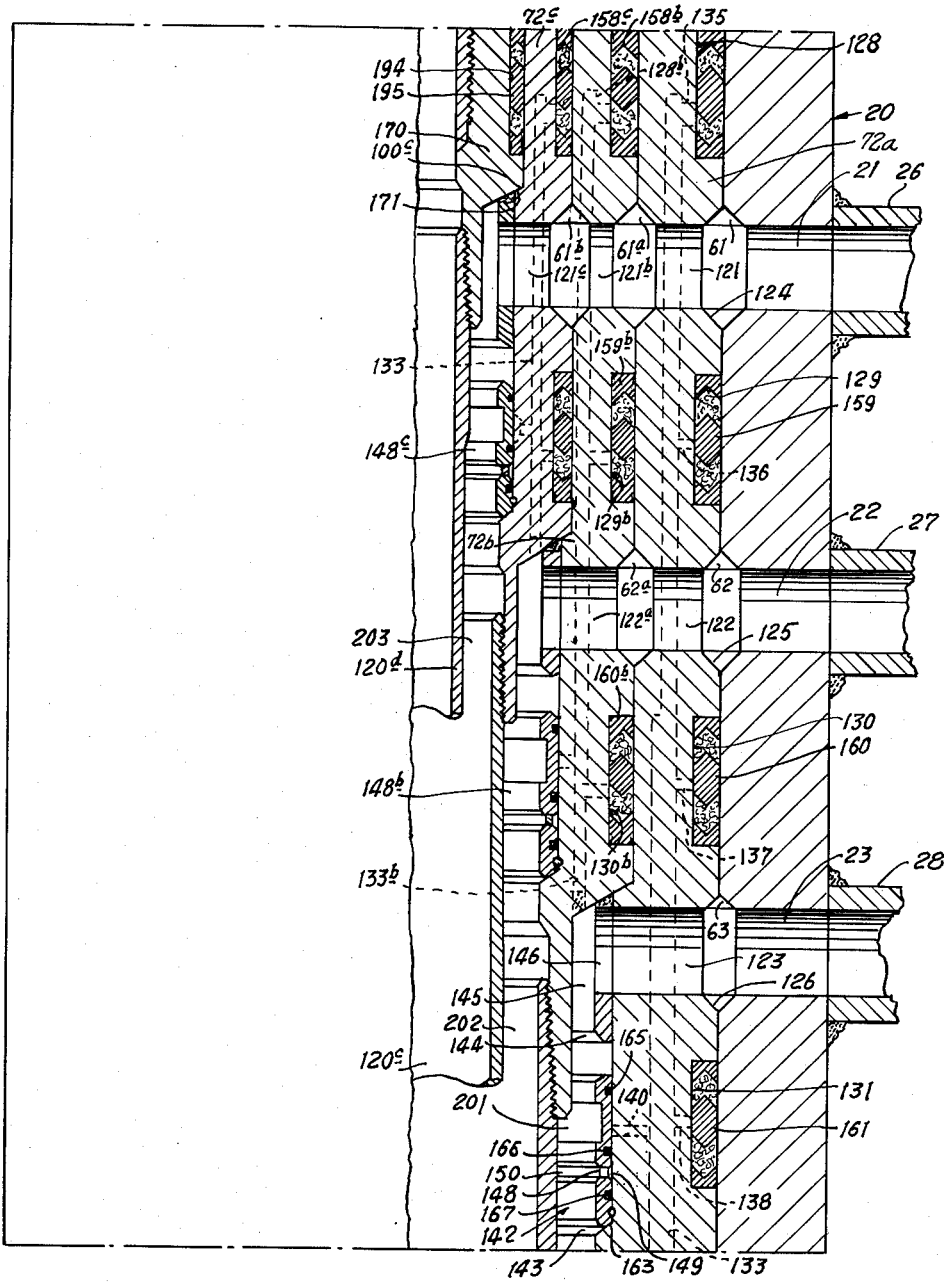
FIGURE 2 is a vertical sectional view, being a continuation of FIGURE 1, showing an intermediate portion of the well tool assembly.
Figure 3:
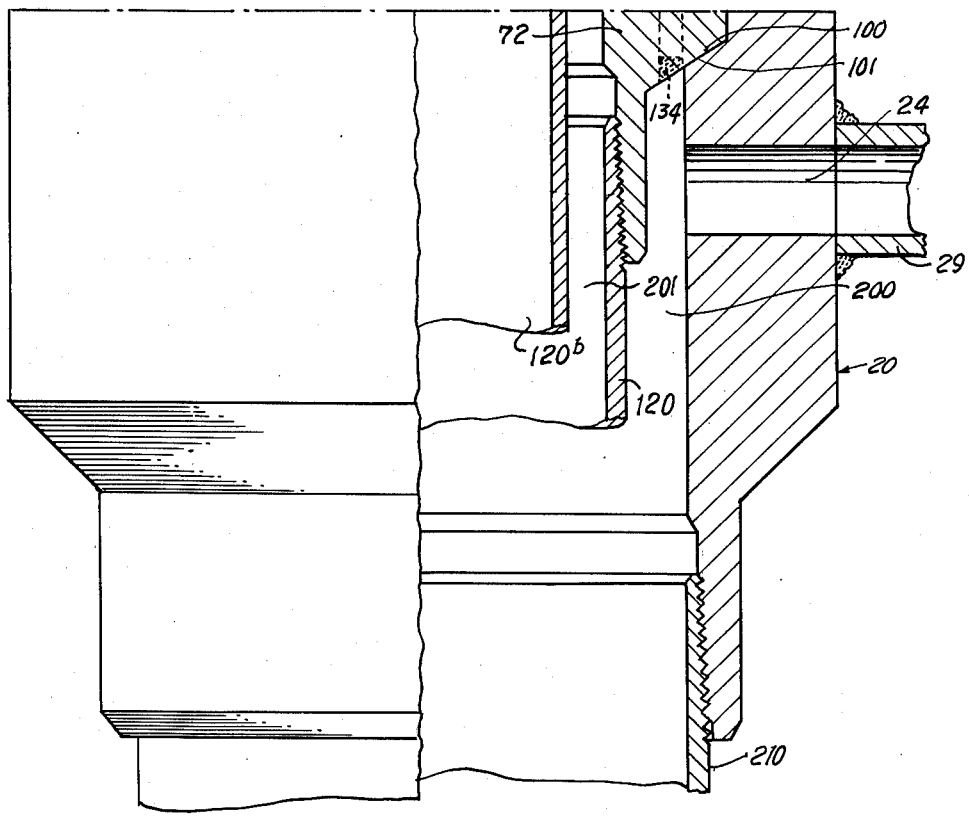
FIGURE 3 is a vertical sectional view being a continuation of FIGURE 2, showing the lower portion of the well tool assembly.
Figure 4:
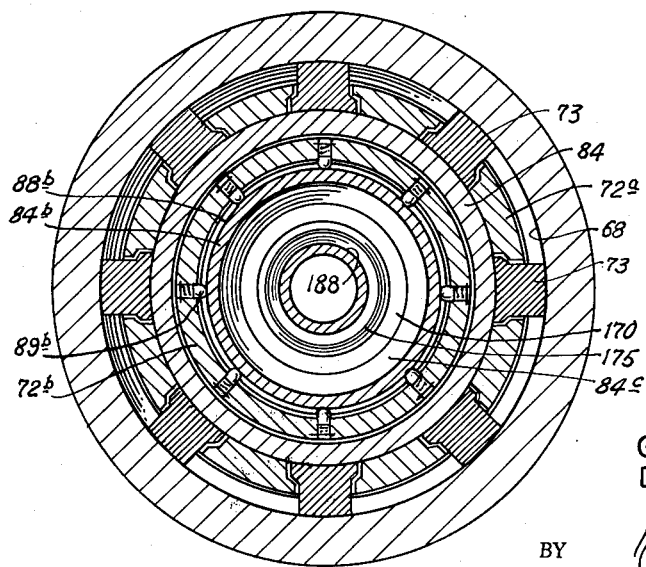
FIGURE 4 is a sectional view taken on line 4—4 of FIGURE 1.
Figure 5:
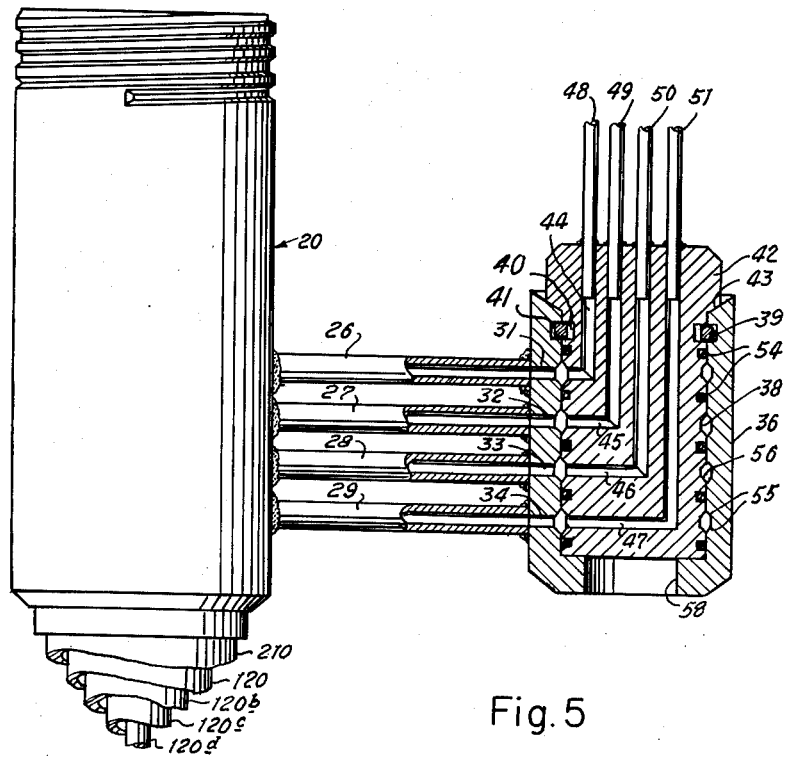
FIGURE 5 is a fragmentary partly sectional view of the wellhead showing the manner in which the lateral conduits of the wellhead may be connected to a remote point.

It will further be seen that while the seal fluid passages through which a setting seal fluid may be introduced into the recesses in which the seals are disposed have been described as being filled with seal fluid by an injecting tool, it will be apparent that such passages may be filled with seal fluid prior to the lowering of the mandrels into the well. In this case, the pressure of the well fluids, when the seal valves 148 of the hangers shown in FIGURE 2 are in open position, causes the sealing fluids to flow into the seal recesses. The ball check valves of the mandrels illustrated in FIGURE 9 will of course open to permit the pressure of well fluids to similarly force the setting seal fluids to flow into the seal recesses even if an injecting tool is not employed.

In FIGURES 13 and 14 of the drawings, the mandrels 72a are shown as having modified forms of the lock sleeves 84a which are formed with internal annular recesses 501 which provide an abrupt upwardly facing shoulder 502 adapted to engage an inherently downwardly biased resilient non-shearable snap ring 504 disposed in an internal recess 505 of the mandrel 72a located above the shear screw 86. The recess 505 has an upwardly and inwardly tapered wall surface 506 so that the snap ring is also cammed inwardly into the base of the mandrel 72a as it is moved upwardly in the internal recess 505. The mandrel 72a is also provided with another annular internal recess 508 in which is received a shearable inherently resilient snap ring 509 which is engageable in an external annular recess 510 of the lock sleeve 84a.

It will be apparent now that when it is desired to lower the mandrel 72a into the wellhead 20 the lock sleeve is secured to the mandrel in a raised position relative thereto by the shearable screw 86 so that the lock dogs 73 are free to move inwardly to retracted positions. The non-shearable snap ring 504 is in its expanded position as shown in FIGURE 13 and the shearable snap ring 509 bears against the outer surface of the lock sleeve 84a above the external recess 501 thereof. When the mandrel 72a is lowered to a position where it engages the upwardly facing shoulder 100 of the wellhead, further downward movement of the mandrel 72a is arrested. Downward force imparted to the lock sleeve 84a by means of the running tool then causes the shear screw 86 to shear and permit downward movement of the lock sleeve relative to the mandrel. During such downward movement of the lock sleeve in the mandrel, the cam shoulder 82 of the lock sleeve cams the lock dogs outwardly into expanded positions in the lock recess 68 of the wellhead. When the lock sleeve is moved to this position, the snap ring 509 enters into the external annular recess 510 of the lock sleeve to hold the lock sleeve in the position illustrated in FIGURE 13 against accidental upward displacement in the mandrel 72a.

When it is desired to remove the mandrel 72a, a running tool 512 is lowered into the well until the circumferentially spaced dogs 513 thereof are in alignment with the lock recess 98 of the lock sleeve whereupon the downwardly facing shoulder 514 of the dog carrier sleeve 515 of the running tool engages the upper end of the lock sleeve to arrest further downward movement of the dog carrier sleeve relative to the lock sleeve. The dog carrier sleeve is provided with suitable windows or apertures 517. The dogs 513 are disposed in the apertures for movement between expanded and retracted positions.

The running tool is also provided with an inner mandrel 519 which has an enlarged lock portion 520 which provides a downwardly and outwardly extending cam shoulder 522 which is adapted to engage the upwardly and inwardly disposed cam shoulders 523 of the lock dogs 513 whereby upward movement of the inner mandrel relative to the dog carrier sleeve 515 causes the running tool lock dogs 513 to be cammed to the expanded positions illustrated in FIGURE 14. The dog carrier sleeve 515 is biased downwardly toward its lowermost position on the inner mandrel 519 by means of a spring 524 which bears against the bottom shoulder 525 of the sub 526 of the running tool, into which the upper end of the inner mandrel 519 is threaded, and against the upper end 528 of the dog carrier sleeve 515. Downward movement of the dog carrier sleeve 515 of the inner mandrel is limited by the annular upwardly facing shoulder 529 of the inner mandrel which engages the lower end of the dog carrier sleeve.

When it is desired to remove the mandrel 72a from the wellhead 20, the running tool 512 is lowered into the well, the upward and outward shoulders 530 of the dogs 513 camming the dogs 513 inwardly upon meeting upwardly facing obstructions, the dog carrier sleeve moving upwardly against the resistance of the spring 524 whenever such obstructions are encountered until the dogs 513 are disposed above the cam shoulder 522 of the inner mandrel 519 to permit such inward movement of the dogs 513.

When the running tool is telescoped into the upper end of the lock sleeve, the dogs 513 thereof are aligned with the lock recess 98 of the lock sleeve whereupon an upward movement of the sub 526 causes the cam shoulder of the inner mandrel of 519 to engage the shoulders 523 of the lock dogs to cam them into fully expanded positions in the lock recess 98 and simultaneously move the lock portion 520 of the inner mandrel behind the inner surfaces of the lock dogs 513 thereby locking the dogs 513 in the expanded position shown in FIGURE 13.

A further upward pull imparted to the running tool 512 now causes the lock sleeve 84a to move from the position illustrated in FIGURE 13 to the position illustrated in FIGURE 14 wherein the non-shearable snap ring 504 is disposed in the external recess 501 of the lock sleeve, the shearable snap ring 509 shearing to permit such upward movement of the lock sleeve relative to the mandrel. It will be noted that the upwardly and inwardly sloping wall 506 of the recess 505 causes the non-shearable snap ring 504 to move inwardly in the external recess 501 of the lock sleeve, the abrupt shoulder 502 of the lock sleeve engaging the non-shearable snap ring to cause such upward movement of the snap ring in the internal recess 505 of the mandrel. Further upward movement now causes the mandrel 72a to move upwardly as the dogs 73 of the mandrel are now free to move inwardly to retracted positions, since the lock sleeve is now disposed above the mandrel dog 73. The mandrel dogs 73 are of course cammed inwardly due to the camming action of the cam shoulders 108 thereof with the shoulder 69 of the recess 68.

The lock sleeve 84b illustrated in FIGURE 13 is provided with a plurality of dogs 535 instead of with a non-shearable snap ring 504. The lock dogs 535 are disposed in a recess formed between the opposed upper and lower annular shoulders 537 and 538 of a retainer nut 540 threaded in the upper end of the mandrel 72b. The dogs 535 are provided with external slots through which extends a garter spring 536 which resiliently biases the dogs 535 into contact with the outer surface 539 of the lock sleeve 84b. The retainer ring 540 and the lock sleeve 84b are provided with opposed annular recesses in which is receivable the shearable snap ring 509. It will be apparent that the lock dogs 535 function in the same manner as the non-shearing snap ring 504 to enter into the external recess 501 of the lock sleeve to limit upward movement of the lock sleeve relative to the mandrel when the lock sleeve is engaged by suitable running tool, such as the running tool 572 illustrated in FIGURE 14.

It will now be apparent that the mandrels 72a and 72b illustrated in FIGURES 13 and 14 are provided with means which limit upward movement of the lock sleeves in the mandrels whereby a running tool which engages only in the recesses 98 and 98b of the mandrels may be employed to remove the hanger mandrels from the wellhead.

Figure 15:
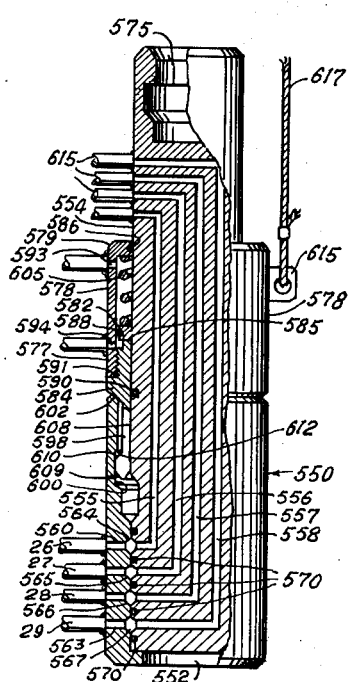

In FIGURE 15 is illustrated another form of bowl 550 to which the lateral conduits 26, 27, 28 and 29 are connected. The bowl 550 is provided with an aperture 552 at its lower end which permits flow of fluids out of the lower end thereof when the conduit mandrel 554 is inserted in the upper end of the bowl. The mandrel 554 is provided with internal flow passages 555, 556, 557 and 558 which communicate with the lateral ports 560, 561, 562 and 563, respectively, of the bowl through the annular passages 564, 565, 566 and 567 formed by internal and external annular recesses in the bowl and in the conduit mandrel 554 when the conduit mandrel is in the fully telescoped position in the bowl illustrated in FIGURE 15. The conduit mandrel 554 is provided with suitable external annular seal recesses in which are disposed the seals 570 which seal between the bowl and the conduit mandrel above and below each of the annular flow passages 564, 565, 566 and 567 to prevent flow of fluids therebetween.

The conduit mandrel is provided with an internal flange 575 by means of which it may be lowered into the bowl and is also provided with a collet sleeve 577. The collet sleeve has an upper sleeve section 578 provided with an upper internal flange 579 located above the external flange 582 of the conduit mandrel 554. The lower collet section 584 of the collet sleeve 577 provides an upwardly facing shoulder 585 which is adapted to engage the lower surface of the external flange 582 to limit upward movement of the collet sleeve on the conduit mandrel. The upper sleeve section 578 is threaded on the upper end of the lower collet section 584.

The internal flange 579 of the upper section is provided with an internal annular recess in which is disposed a ring seal 586 which seals between the flange and the conduit mandrel while the external flange 582 is provided with an external annular recess in which is received the seal 588 which seals between the conduit mandrel and the inner surface of the lock sleeve of the upper sleeve section. The conduit mandrel is also provided with an external recess below its external flange in which is disposed a seal 590 which seals between the mandrel and the lower collet section 584. Similarly the lower collet section is provided with an external annular recess in which is received the seal ring 591 which seals between the two sections below the shoulder 585.

The upper sleeve section 578 is provided with lateral ports 593 and 594 having suitable fittings by means of which the ports may be connected to a source of fluid under pressure.

It will be apparent that when fluid under pressure is injected into the sleeve section 578 above the external flange 582, while the lower port is vented, the collet sleeve will move upwardly on the mandrel to the position illustrated in FIGURE 15 and that when fluid under pressure is introduced into the upper sleeve section 578 through the port 594 while the upper port 593 is vented, the collet sleeve 577 will move downwardly to the position illustrated in FIGURE 15. The collet section 584 is provided with collet fingers 598. The collet fingers are resilient and provided with external bosses 599 which are receivable in the internal annular recess 600 of the bowl when the downwardly facing shoulder 602 of the lower collet section 584 engages the upper end of the bowl.

A spring 605 is disposed within the upper sleeve section 578 and its upper ends bear against the flanges 579 and 582 of the collet member and of the conduit mandrel, respectively, to bias the collet member to an upper position on the conduit mandrel.

In use, when it is desired to position the conduit mandrel in the bowl 550 the conduit mandrel is lowered into the bowl, by means of a suitable running tool which engages the internal flange 575 provided at the upper end of the conduit mandrel, until the conduit mandrel is seated in the bowl in the position illustrated in FIGURE 15. The collet fingers 598 are now so positioned that the bosses 599 thereof are disposed in alignment with the internal annular lock recess 600 of the bowl. During the downward movement of the conduit mandrel into the bowl, the collet sleeve 577 is held in a lower position on the mandrel 575 by means of pressure which is introduced into the collet member sleeve 578 through the port 594 thereof. The collet fingers 598 are thus disposed below the lock surface 608 of the mandrel so that the collet fingers will flex inwardly when the cam shoulders 609 engage the top of the bowl and telescope therein till they are aligned with the internal lock recess 600. Fluid under pressure is then introduced into the sleeve section 578 through the upper port 595 through a suitable conduit connected to the port by means of the aforementioned fittings whereby the conduit mandrel is forced to move downwardly relative to the collet member and its enlarged lock surface 608 moves behind the collet fingers 598 and holds them in the extended positions where their bosses 599 engage in the lock recess 600. The mandrel 554 is thus held against accidental displacement from the bowl.

It will be apparent that once the conduit mandrel has been properly seated in the bowl, the spring 605 holds the conduit mandrel downwardly relative to the collet member against accidental upward displacement relative thereto even when no pressure is introduced into the collet sleeve 578 through the mandrel 593.

The collet sleeve 578 is also provided with an outwardly extending lug 615 to which may be secured a retrieving line 617.

When it is desired to remove the conduit mandrel from the bowl, fluid under pressure is admitted into the upper sleeve section 578 to cause the conduit mandrel to move upwardly relative to the collet sleeve. Such upward movement of the inner conduit causes the locking surface 608 to move above the collet fingers which are thus freed to flex inwardly. An upward pull now imparted to the retrieving line will cause the collet sleeve, and the inner mandrel, to move upwardly from the bowl, the cam shoulders 610 and 612 of the collet bosses 599 and of the bowl camming the collet fingers inwardly to permit such movement.

It will now be apparent that fluid flow from the lateral conduits 26, 27, 28 and 29 to the surface of the body of water may be accomplished by the insertion of the conduit mandrel 544 in the bowl 550. It will further be apparent that such flow to the surface may be accomplished by means of upwardly extending conduits 615 which are rigidly secured to the conduit mandrel by any suitable means, such as welds, and which communicate with the flow passages 555, 556, 557 and 558 of the conduit mandrel.

It will further be seen that the conduit mandrel may be easily removed from the bowl without the use of any running tool or locating tool simply by injecting fluid under pressure through the lower port 594 into the upper sleeve section of the collet sleeve and then pulling upwardly on the retrieving line 617. The retrieving line 617 and the fluid pressure conduits which are connected to the fittings of the ports 593 and 594 of course remain connected to the conduit mandrel at all times.

It will therefore be seen that new and improved well tool systems have been illustrated and described which permit a plurality of well tools to be connected in a wellhead from a remote location in order to provide a flow of fluids between a plurality of flow passages formed in the wellhead and a remote location such as the surface of the water above the wellhead.

It will further be seen that the wellhead may be provided with a plurality of lateral conduits which are connected to an external bowl and that the conduits which extend from the wellhead to the surface of the body of water may be connected to a conduit mandrel which is releasably connectable in the bowl and to which the conduits are connected.

It will further be seen a new and improved means for releasably securing the conduit mandrel in the bowl has been illustrated and described which permits removal of the inner mandrel from the bowl without the use of any locating or running tools.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well tool for use with a tubular member having a plurality of longitudinally spaced lateral ports and an upwardly facing stop means including: a tubular mandrel having a downwardly facing shoulder for engaging said stop means for limiting downward movement of the mandrel in said tubular member, said mandrel having at least one lateral port which is placed in communication with one of said lateral ports of said tubular member when said mandrel is positioned in said tubular member with said shoulder engaging said stop means, said mandrel having seal means disposed on opposite sides of said one lateral port of said mandrel and said one of said lateral ports of said tubular member when said mandrel is positioned in said tubular member with said shoulder engaging said stop means for sealing between said mandrel and said tubular member, said mandrel having seal recesses in which said seal means are disposed above and below said one lateral port and a flow passage communicating with the interior of the mandrel and said seal recesses whereby fluid under pressure may be transmitted to said seal recesses to cause the seal means to be compressed against said tubular member, said valve means comprising a valve sleeve longitudinally movable in said mandrel and movable between an open position wherein fluid may be injected into said passage and a closed position wherein flow of fluid from said valve passage is prevented.

2. A well tool for use with a tubular member having a plurality of longitudinally spaced lateral ports and an upwardly facing stop means including: a tubular mandrel having a downwardly facing shoulder for engaging said stop means for limiting downward movement of the mandrel in said tubular member, said mandrel having at least one lateral port which is placed in communication with one of said lateral ports of said tubular member when said mandrel is positioned in said tubular member with said shoulder engaging said stop means, said mandrel having seal means disposed on opposite sides of said one lateral port of said mandrel and said one of said lateral ports of said tubular member when said mandrel is positioned in said tubular member with said shoulder engaging said stop means for sealing between said mandrel and said tubular member, said tubular member being provided with a lock recess, said mandrel being provided with lock means positionable in alignment with said lock recess when said stop means are engaged, said lock means being movable into said lock recess to prevent upward movement of said mandrel in said tubular member.

3. A well tool for use with a tubular member having a plurality of longitudinally spaced lateral ports and an upwardly facing stop means including: a tubular mandrel having a downwardly facing shoulder for engaging said stop means for limiting downward movement of the mandrel in said tubular member, said mandrel having at least one lateral port which is placed in communication with one of said lateral ports of said tubular member when said mandrel is positioned in said tubular member with said shoulder engaging said stop means, said mandrel having seal means disposed on opposite sides of said one lateral port of said mandrel and said one of said lateral ports of said tubular member when said mandrel is positioned in said tubular member with said shoulder engaging said stop means for sealing between said mandrel and said tubular member, said tubular member being provided with a lock recess, said mandrel being provided with lock means positionable in alignment with said lock recess when said stop means are engaged by said shoulder, said lock means being movable into said lock recess to prevent upward movement of said mandrel in said tubular member, and means on said mandrel for moving said lock means into expanded position, said means locking said lock means in expanded position to prevent inward movement thereof from said expanded position.

4. A well tool for use with a tubular member having a plurality of longitudinally spaced lateral ports and an upwardly facing stop means including: a tubular mandrel having a downwardly facing shoulder for engaging said stop means for limiting downward movement of the mandrel in said tubular member, said mandrel having at least one lateral port which is placed in communication with one of said lateral ports of said tubular member when said mandrel is postioned in said tubular member with said shoulder engaging said stop means, said mandrel having seal means disposed on opposite sides of said one lateral port of said mandrel and said one of said lateral ports of said tubular member when said mandrel is positioned in said tubular member with said shoulder engaging said stop means for sealing between said mandrel and said tubular member, said mandrel having seal recesses in which said seal means are disposed above and below said one lateral port and a flow passage communicating with the interior of the mandrel and said seal recesses whereby fluid under pressure may be transmitted to said seal recesses to cause the seal means to be compressed against said tubular member, said mandrel having an inwardly and downwardly sloping surface, and wedge means insertable in said mandrel and engageable by said surface for locking a casing telescoped in said mandrel against movement in said mandrel.

5. A well tool for use with a tubular member having a plurality of longitudinally spaced lateral ports and an upwardly facing stop means including: a tubular mandrel having a downwardly facing shoulder for engaging said stop means for limiting downward movement of the mandrel in said tubular member, said mandrel having at least one lateral port which is placed in communication with one of said lateral ports of said tubular member when said mandrel is positioned in said tubular member with said shoulder engaging said stop means, said mandrel having seal means disposed on opposite sides of said one lateral port of said mandrel and said one of said lateral ports of said tubular member when said mandrel is positioned in said tubular member with said shoulder engaging said stop means for sealing between said mandrel and said tubular member, said mandrel having seal recesses in which said seal means are disposed above and below said one lateral port and a flow passage communicating with the interior of the mandrel and said seal recesses whereby fluid under pressure may be transmitted to said seal recesses to cause the seal means to be compressed against said tubular member, said mandrel having an inwardly and downwardly sloping surface, and wedge means insertable in said mandrel and engageable by said surface for locking a casing telescoped in said mandrel against movement in said mandrel, said wedge means comprising a plurality of wedges having serrated internal surfaces and having downwardly and inwardly inclined outer surfaces engageable by said sloping surface.

6. A well tool system including: a housing having a plurality of spaced ports; a plurality of hanger members disposed in telescoped relation in said housing; well casings connected to said hanger members and depending therefrom in spaced relation to one another to form flow passages; said members being provided with lateral ports communicating with said flow passages and said lateral ports of said housing whereby fluid may flow between the exterior of said housing and said flow passages; and means for individually releasably locking said members to one another and for releasably locking the outermost of said hanger members to said housing.

7. A well tool system including: a housing having a plurality of ports; a plurality of hanger members disposed in telescoped relation in said housing; well casings connected to said hanger members and depending therefrom in spaced relation to one another to form flow passages; said members being provided with lateral ports communicating with said flow passages and said lateral ports of said housing whereby fluid may flow between the exterior of said housing and said flow passages; and seal means for sealing between said members above each of said lateral ports, said hanger members having seal recesses, said seal means being disposed in said seal recesses, said hanger members having passages communicating with the seal recesses and the interiors of said hanger members whereby fluid under pressure may be introduced into said seal recesses of said hanger members.

8. A well tool system including: a housing having a plurality of lateral ports; a plurality of hanger members disposed in telescoped relation in said housing; well casings connected to said hanger members and depending therefrom in spaced relation to one another to form flow passages; said members being provided with lateral ports communicating with said flow passages and said lateral ports of said housing whereby fluid may flow between the exterior of said housing and said flow passages; seal means for sealing between said members above each of said lateral ports, said hanger members having seal recesses, said seal means being disposed in said seal recesses, said hanger members having passages communicating with the seal recesses and the interiors of said hanger members whereby fluid under pressure may be introduced into said seal recesses of said hanger members; and valve means for preventing flow of fluid through the passages into the interior of said hanger members.

9. A well tool system including: an outer tubular member having a plurality of longitudinally spaced lateral flow ports therein; a plurality of tool carrying inner tubular members for connecting well tools in said outer tubular member, said inner tubular members comprising an innermost laterally imperforate tubular member and at least one intermediate inner tubular member between said innermost tubular member and said outer tubular member; first cooperable means on said outer tubular member and said inner tubular members positioning adjacent tubular members in predetermined telescoped vertical relation to one another; second cooperable means on each of said inner tubular members and said outer tubular member releasably securing adjacent members to one another in such predetermined telescoped vertical relation to one another; each of said intermediate tubular members being provided with at least one lateral flow port, said lateral ports of said intermediate tubular members and said outer tubular member being disposed to communicate with correspondingly positioned lateral ports of the intermediate tubular members and the outer tubular members disposed outwardly thereof; external seal means on each of said intermediate tubular members sealing between said intermediate tubular member and the next outwardly adjacent tubular member on opposite sides of each lateral port of said each intermediate tubular member; said lateral ports and said seal means of said intermediate tubular members and said outer tubular member providing separate lateral flow courses from the bore of each of said tubular members through said port therein to one of the lateral ports of said outer tubular member separate from the flow courses from the bore of each of the others of said intermediate tubular members; and external seal means on said innermost tubular member sealing between said innermost tubular member and the next outwardly adjacent tubular member above the lateral flow port in said next outwardly adjacent tubular member.

10. The well tool system of claim 9 wherein said first cooperable means comprises an upwardly facing shoulder on each member for limiting downward movement of the next tubular member therein.

11. The well tool system of claim 10 wherein said second cooperable means includes lock recesses provided in said tubular members and lock means carried by each of said tool carrying inner tubular members, each of the lock means being movable to expanded positions in the lock recess of the tubular member in which said each tool carrying tubular member is disposed to prevent upward movement of said tool carrying tubular member relative to the tubular member in which such carrying tubular member is telescoped.

12. The well tool system of claim 11; and locking means carried by each of said tubular members for releasably locking said lock means in said expanded positions.

13. The well tool system of claim 12 wherein each of said tool carrying tubular members has a well casing connected thereto which extends downwardly through said outer tubular member, said well casings being spaced to provide a plurality of cylindrical spaced flow passages, each of said flow passages communicating exclusively with the bore of a single one of said tool carrying inner tubular members and the flow passage therefrom to the lateral flow port of said outer tubular member whereby fluids may be transmitted between said cylindrical flow passages and the exterior of the outer tubular member.

14. The well tool system of claim 13 wherein said tool carrying inner tubular members have external seal recesses, said seal means being disposed in said seal recesses, said tool carrying tubular members having flow passages extending between the seal recesses and the interiors thereof whereby fluid may be injected into said seal recesses to cause such seal means to be compressed into very tight engagement with the tubular members it engages.

15. The well tool system of claim 14, wherein said flow passages are provided with valve means for permitting flow of fluids into the flow passage but preventing flow of fluids from said passage into the interiors of said tool carrying members.

16. The well tool system of claim 15, wherein said valve means comprises a ball check valve.

17. The well tool system of claim 15, wherein said valve means comprises valve sleeves movable between longitudinally spaced open and closed positions in said tool carrying inner tubular members.

18. The well tool system of claim 9 and a bowl having an open upper end laterally spaced from said outer tubular member and having a plurality of lateral ports; and conduit means extending between said ports of said outer tubular member and said bowl.

19. The well tool system of claim 18, wherein said bowl has lock means for engaging a well tool receivable therein.

20. The well tool system of claim 19, wherein said well tool is removably disposed in said bowl and has flow passages communicating with said lateral ports of said bowl.

21. The well tool system of claim 20 and conduit means connected to said well tool and communicating with said flow passages of said well tool.

22. A well tool for use with a tubular member having a plurality of longitudinally spaced lateral ports and an upwardly facing stop means including: a tubular mandrel having a downwardly facing shoulder for engaging said stop means for limiting downward movement of the mandrel in said tubular member, said mandrel having at least one lateral port, one of said mandrel and said tubular member having means providing communication between said one lateral port of said mandrel and one of said lateral ports of said tubular member when said shoulder is in engagement with said stop means, said mandrel having seal means disposed on opposite sides of said one lateral port of said mandrel and said one of said lateral ports of said tubular member when said shoulder is in engagement with said stop means for sealing between said mandrel and said tubular member, said mandrel having seal recesses in which said seal means are disposed above and below said one lateral port and a flow passage communicating with the interior of the mandrel and said seal recesses whereby fluid under pressure may be transmitted to said seal recesses to cause the seal means to become compressed against said tubular member.

23. The well tool of claim 22, and valve means for preventing flow of fluid from said flow passage to the interior of said mandrel wherein said valve means comprises a ball check valve.

24. The well tool of claim 23, wherein said valve means comprises a ball check valve.

25. A well tool for use with a tubular member having a plurality of longitudinally spaced lateral ports and an upwardly facing stop means including: a tubular mandrel having a downwardly facing shoulder for engaging said stop means for limiting downward movement of the mandrel within said tubular member, said mandrel having a plurality of longitudinally spaced ports and having at least one lateral port which is placed in communication with one of said lateral ports of said tubular member when said mandrel is positioned in said tubular member with said shoulder engaging said stop means, said mandrel having seal means disposed on opposite sides of said one lateral port of said mandrel and said one of said lateral ports of said tubular member when said mandrel is positioned in said tubular member with said shoulder engaging said stop means for sealing between said mandrel and said tubular member, said tubular member having downwardly and inwardly inclined seal surfaces between each pair of lateral ports, each of said seal surfaces being of progressively smaller diameter than the seal surface immediately above it, said seal means on said mandrel being annular members extending outwardly of said mandrel for engaging said seal surfaces, each of said lateral ports of said mandrel being positioned between a pair of said annular members.

References Cited in the file of this patent

UNITED STATES PATENTS

| | | |
|---|---|---|
| 1,036,547 | Bell | Aug. 27, 1912 |
| 1,836,419 | Wigle | Dec. 15, 1931 |
| 1,849,374 | McEvoy et al. | Mar. 15, 1932 |
| 2,035,834 | Penick et al. | Mar. 31, 1936 |
| 2,094,690 | Wickersham et al. | Oct. 5, 1937 |
| 2,096,565 | Shaffer et al. | Oct. 19, 1937 |
| 2,118,094 | McDonough et al. | May 24, 1938 |
| 2,491,599 | Allen | Dec. 20, 1949 |
| 2,889,886 | Gould | June 9, 1959 |